US009191090B2

(12) United States Patent
Avudainayagam et al.

(10) Patent No.: US 9,191,090 B2
(45) Date of Patent: Nov. 17, 2015

(54) ADAPTING BEAMFORMING PARAMETERS IN A COMMUNICATION NETWORK

(71) Applicant: QUALCOMM Incorporated, San Diego, CA (US)

(72) Inventors: Arun Avudainayagam, Gainesville, FL (US); Deniz Rende, Gainesville, FL (US); Manjunath Anandarama Krishnam, San Jose, CA (US); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/245,696

(22) Filed: Apr. 4, 2014

(65) Prior Publication Data

US 2015/0117329 A1  Apr. 30, 2015

Related U.S. Application Data

(60) Provisional application No. 61/895,931, filed on Oct. 25, 2013.

(51) Int. Cl.
*H04B 7/06* (2006.01)
*H04B 3/54* (2006.01)
(Continued)

(52) U.S. Cl.
CPC ............... *H04B 7/0617* (2013.01); *H04B 3/54* (2013.01); *H04B 7/0621* (2013.01);
(Continued)

(58) Field of Classification Search
None
See application file for complete search history.

(56) References Cited

U.S. PATENT DOCUMENTS

| 8,068,844 | B2 | 11/2011 | Li et al. | |
| 8,345,732 | B2 * | 1/2013 | Fischer | H04B 7/0617 375/219 |

(Continued)

FOREIGN PATENT DOCUMENTS

| WO | 02082689 | 10/2002 |
| WO | 2012041424 | 4/2012 |

(Continued)

OTHER PUBLICATIONS

"PCT Application No. PCT/US2014/061899 International Search Report", Jan. 27, 2015, 11 Pages.

(Continued)

*Primary Examiner* — Hong Cho
(74) *Attorney, Agent, or Firm* — DeLizio Law, PLLC

(57) ABSTRACT

A network device may be configured to adapt beamforming parameters for a communication region of a powerline cycle in response to variations in communication channel conditions. A first network device can estimate initial beamforming parameters for each communication region based on sounding messages received from a second network device. The first network device can determine coarse beamforming parameters for each communication region based on data packets received from the second network device using the initial beamforming parameters. The first network device can determine a difference parameter for the first communication region based, at least in part, on a first initial beamforming parameter associated with the first communication region and a first coarse beamforming parameter associated with the first communication region. The first network device can compare the difference parameter with a difference threshold to determine whether to estimate a first modified beamforming parameter for a first communication region.

30 Claims, 7 Drawing Sheets

(51) Int. Cl.
  *H04B 7/08* (2006.01)
  *H04L 25/02* (2006.01)
  *H04L 25/03* (2006.01)

(52) U.S. Cl.
  CPC .......... *H04B 7/0634* (2013.01); *H04B 7/0639* (2013.01); *H04B 7/0842* (2013.01); *H04L 25/021* (2013.01); *H04L 25/0204* (2013.01); *H04L 25/0248* (2013.01); *H04L 25/03159* (2013.01); *H04B 2203/5408* (2013.01); *H04B 2203/5412* (2013.01); *H04B 2203/5466* (2013.01); *H04L 25/0228* (2013.01); *H04L 2025/03426* (2013.01); *H04L 2025/03802* (2013.01)

(56) References Cited

U.S. PATENT DOCUMENTS

| | | | |
|---|---|---|---|
| 8,472,381 B1* | 6/2013 | Lee | H04W 4/00 370/328 |
| 9,099,776 B2* | 8/2015 | Vasavada | H01Q 3/267 1/1 |

| | | | |
|---|---|---|---|
| 2011/0002263 A1 | 1/2011 | Zhu et al. | |
| 2012/0051246 A1 | 3/2012 | Zhang et al. | |
| 2012/0051408 A1 | 3/2012 | Van Zelst et al. | |
| 2012/0257683 A1 | 10/2012 | Schwager | |
| 2013/0163684 A1 | 6/2013 | Yonge et al. | |
| 2014/0003481 A1* | 1/2014 | Keusgen | H04B 7/0695 375/227 |

FOREIGN PATENT DOCUMENTS

| | | |
|---|---|---|
| WO | 2012174456 | 12/2012 |
| WO | 2015061531 | 4/2015 |

OTHER PUBLICATIONS

Schneider, Daniel et al., "Precoded Spatial Multiplexing MIMO for Inhome Power Line Communications", Global Telecommunications Conference, 2008. IEEE, Piscataway, NJ, USA Nov. 30, 2008, pp. 1-5.

* cited by examiner

US 9,191,090 B2

ADAPTING BEAMFORMING PARAMETERS IN A COMMUNICATION NETWORK

RELATED MATTERS

This application claims priority benefit of U.S. Provisional Patent Application No. 61/895,931 filed on Oct. 25, 2013.

BACKGROUND

Embodiments of the inventive subject matter generally relate to the field of communication networks and, more particularly, to adapting beamforming parameters in a communication network.

Electric transmission and distribution lines are typically used for providing electric power from generators to buildings, residences, and other components of a city's infrastructure. The electric power may be transmitted over the transmission lines at a high voltage, and may be distributed to buildings and other structures at much lower voltages using electric power lines. Besides providing electric power, electric power lines can also be used to implement powerline communications within buildings and other structures. Powerline communications (PLC) can provide another communication medium for interconnecting network devices. A network device may use various techniques to generate and transmit packets in a PLC network. For example, in a multiple-input multiple-output (MIMO) PLC environment, a network device may apply beamforming parameters to data scheduled to be transmitted to optimize performance on each communication channel.

SUMMARY

Various embodiments are disclosed for adapting beamforming parameters in a PLC network. In some embodiments, a first network device estimates initial beamforming parameters for a plurality of communication regions of a powerline cycle based, at least in part, on sounding messages received from a second network device. The first network device determines coarse beamforming parameters for the plurality of communication regions based, at least in part, on a data packet received from the second network device using the initial beamforming parameters. The first network device determines whether to estimate a first modified beamforming parameter for a first communication region based, at least in part, on a first initial beamforming parameter associated with the first communication region and a first coarse beamforming parameter associated with the first communication region.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1A:
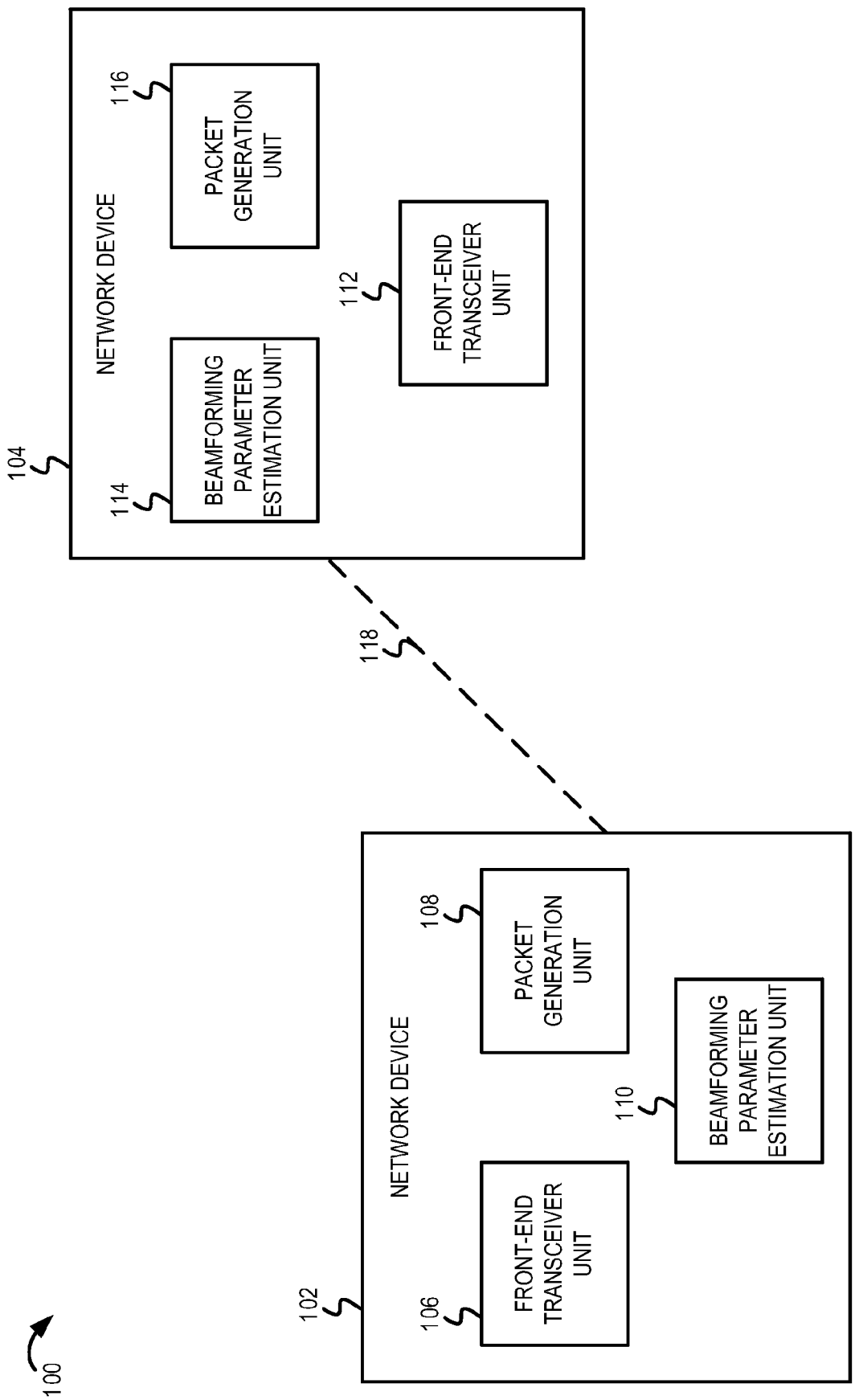
FIG. 1A is an example block diagram of a communication network including a mechanism for adapting beamforming parameters.

The description that follows includes exemplary systems, methods, techniques, instruction sequences, and computer program products that embody techniques of the present inventive subject matter. However, it is understood that the described embodiments may be practiced without these specific details. For instance, although examples refer to adapting beamforming parameters in a powerline communication (PLC) network (e.g., a HomePlug® AV network), embodiments are not so limited. In other embodiments, operations for adapting beamforming parameters described herein can be executed by network devices that implement other suitable communication protocols and techniques (e.g., wireless local area network (WLAN) protocols, such as IEEE 802.11 protocols, multimedia over coax alliance (MoCA) protocols, Ethernet protocols, etc.). In other instances, well-known instruction instances, protocols, structures, and techniques have not been shown in detail in order not to obfuscate the description.

In a PLC network, each half of an alternating current (AC) powerline cycle (e.g., a 50 Hz or 60 Hz AC powerline signal) may be divided into multiple time intervals, referred to as "communication regions," to minimize channel variations and the effects of noise on the PLC channel. For each communication region, beamforming parameters may be determined based, at least in part, on channel characteristics associated with the communication region. The beamforming parameters may be used to weight data (e.g., one or more data symbols) transmitted in a multi-stream environment to compensate for channel variations and noise. In a multi-subcarrier system, such as an orthogonal frequency division multiplexing (OFDM) system, each communication sub-carrier may be associated with beamforming parameters. The beamforming parameters depend on the condition of the PLC channel between a transmitting PLC device and a receiving PLC device. Although PLC protocols, such as HomePlug AV2 protocols, specify some techniques for computing the beamforming parameters, PLC protocols are silent on how to adapt the beamforming parameters to variations in the PLC channel condition.

In some embodiments, a transmitting PLC device and a receiving PLC device can be configured to execute an event-triggered mechanism for adapting the beamforming parameters. The transmitting and the receiving PLC devices may be configured to estimate the beamforming parameters in response to detecting a variation in the PLC channel condition. The receiving PLC device may determine "high-quality" estimates of the PLC channel and beamforming parameters ("initial beamforming parameters") for each communication region based, at least in part, on the training sequences transmitted by the transmitting PLC device. The transmitting PLC device may then start transmitting data packets using the initial beamforming parameters. In response to receiving a data packet, the receiving PLC device may determine coarse estimates of the PLC channel and beamforming parameters ("coarse beamforming parameters") for each communication region from frame control fields of the received data packet. For a data packet received in a first communication region, the receiving PLC device can determine a difference parameter based, at least in part, on the initial beamforming parameters associated with the first communication region and the coarse beamforming parameters associated with the first communication region. For example, the difference parameter may be determined using the difference between the initial beamforming parameters and the coarse beamforming parameters. The receiving PLC device can compare the difference parameter with a difference threshold, determine whether the PLC channel condition has changed, and determine whether to estimate modified beamforming parameters for the first communication region. Such an event-triggered mechanism for adapting the beamforming parameters for each communication region can minimize overhead traffic and improve the response time to variations in PLC channel conditions.

FIG. 1A is an example block diagram of a communication network 100 including a mechanism for adapting beamforming parameters. The communication network 100 includes network devices 102 and 104. The network device 102 includes a front-end transceiver unit 106, a packet generation unit 108, and a beamforming parameter estimation unit 110. Likewise, the network device 104 includes a front-end transceiver unit 112, a beamforming parameter estimation unit 114, and a packet generation unit 116. The network device 102 is communicatively coupled with the network device 104 via a communication link 118. The communication link 118 may be a powerline communication (PLC) link, a wireless local area network (WLAN) link, or another suitable communication link.

In some implementations, the network devices 102 and 104 can be electronic devices such as power meters, electric vehicle charging stations, electric vehicles, power generators, electric power distribution devices, laptop computers, tablet computers, smart appliances, gaming consoles, access points, televisions, television set-top boxes, or other suitable electronic devices with various communication capabilities (e.g., WLAN communication capabilities, PLC capabilities, Ethernet communication capabilities, etc.). In some implementations, the communication network 100 may be an indoor PLC network, such as a home or office network; while in other implementations, the communication network 100 may be an outdoor PLC network, such as a smart power grid. In some embodiments, the network devices 102 and 104 can be configured to communicate using HomePlug AV/AV2/ GreenPHY communication protocols, IEEE 1905 communication protocols, and/or other suitable PLC protocols. In some embodiments, in addition to (or instead of) the PLC protocols, the network devices 102 and 104 may be configured to implement other suitable wired or wireless communication protocols, such as WLAN communication protocols (e.g., IEEE 802.11 communication protocols), Ethernet protocols, MoCA protocols, Bluetooth® protocols, WiMAX protocols, and/or other communication protocols.

A powerline network may be formed using a line (L) wire, a neutral (N) wire, and a ground (G) wire. For powerline communication, the network devices 102 and 104 may use a pair of the line, neutral, and ground wires to transmit and receive messages across the powerline network. Each of the network devices 102, 104, and the communication link 118 may include line, neutral, and ground terminals for transmitting or receiving PLC signals via the powerline network. A pair of wires over which a PLC signal is differentially transmitted or received in the powerline network may be referred to as a PLC channel. A pair of terminals from which a PLC signal is differentially transmitted on a PLC channel may be referred to as a transmit port (or a transmit network interface). A pair of terminals from which a PLC signal is differentially received via the PLC channel may be referred to as a receive port (or a receive network interface). In some embodiments, the network devices 102 and 104 may implement single-input single-output (SISO) communication by exchanging PLC signals via a single port (e.g., an L-N port) over a single communication channel. In other embodiments, the network devices 102 and 104 may implement multiple-input multiple-output (MIMO) communication by exchanging PLC signals via two or more ports and over two or more communication channels. For example, a powerline MIMO communication system may include two transmit ports (e.g., an L-N port and an L-G port) and four receive ports (e.g., an L-N port, an L-G port, an N-G port, and common mode). A common mode signal may be a portion of the transmitted PLC signal that leaks to ground and may be received at a receiving PLC device by providing a low-capacitance path to ground (e.g., by using a large ground plane at the receiving PLC device). For convenience, subsequent operations of the transmitting PLC device and the receiving PLC device will be described for a MIMO PLC system with two transmit ports and two receive ports (i.e., 2×2 MIMO PLC system). However, the operations described herein can be extended to MIMO PLC systems that include other suitable number of transmit ports and receive ports (e.g., a 2×3 MIMO PLC system, a 2×4 MIMO PLC system, etc.). In some embodiments, the network devices 102 and 104 may use orthogonal frequency division multiplexing (OFDM) to communicate via the powerline network. In accordance with OFDM, the network device 102 may simultaneously transmit data over multiple orthogonal carrier signals (also referred to as "communication sub-carriers").

Noise in the powerline network is typically synchronous to the alternating current (AC) powerline cycle (e.g., a 50 Hz or 60 Hz AC powerline signal) because of dynamic loading effects. For example, PLC devices and other network devices connected to the powerline network may switch ON/OFF periodically, thus contributing to the noise and interference on the powerline network. In some embodiments, to combat the effects of periodic noise variations on the powerline network, each half of the AC powerline cycle may be divided into multiple consecutive time intervals, referred to as "communication regions" as will be further described with reference to FIG. 1B.

Figure 1B:
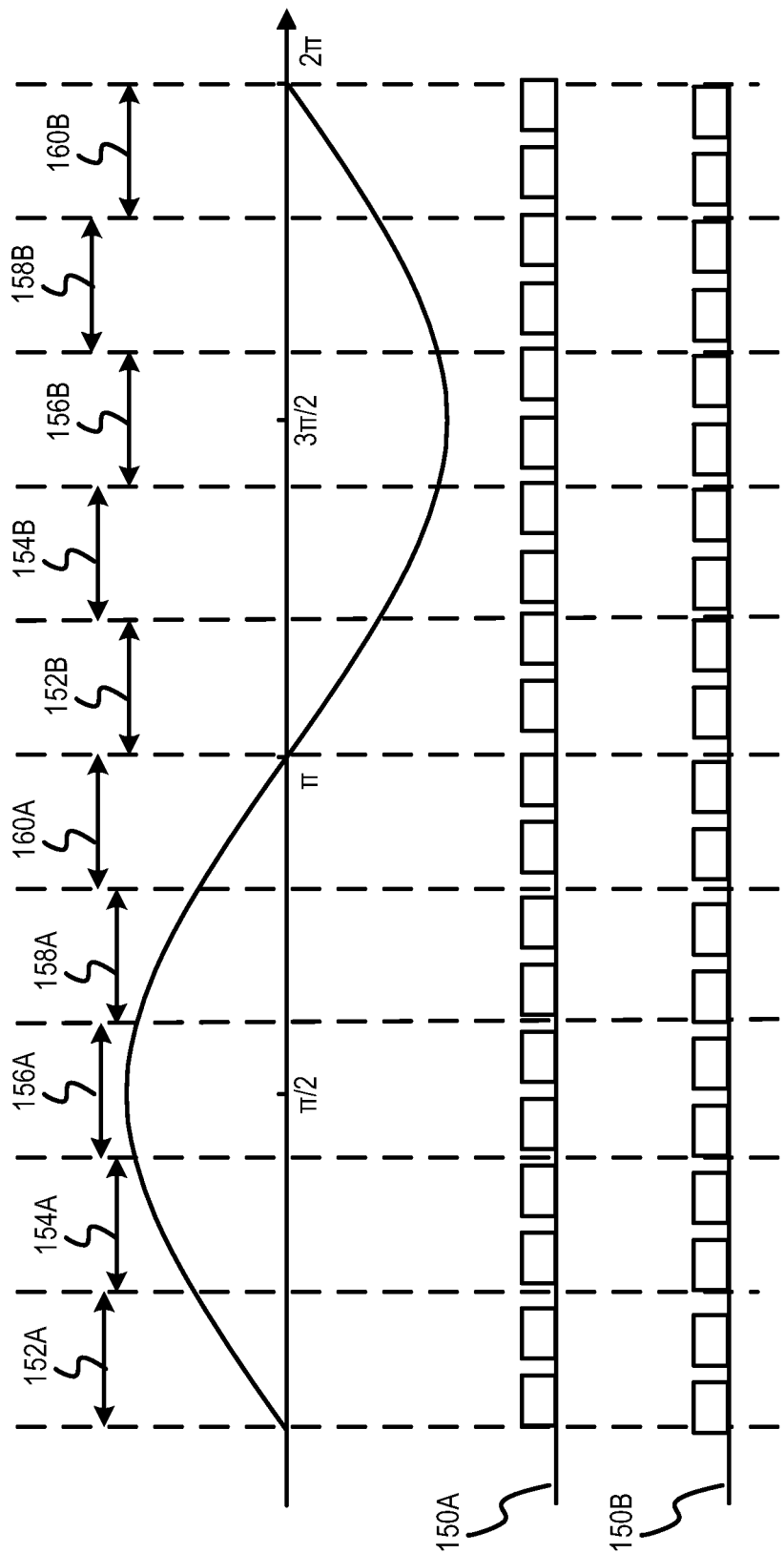
FIG. 1B is an example timing diagram illustrating communication regions within an AC powerline cycle.

FIG. 1B depicts two consecutive powerline cycles 150A and 150B. In the example of FIG. 1B, each half of a powerline cycle is divided into five communication regions. However, in other embodiments, the powerline cycle may be divided into any suitable number of communication regions. In one embodiment, the number and duration of communication regions in the positive half of the powerline cycle may be the same as the number and duration of communication regions in the negative half of the powerline cycle. In the example of FIG. 1B, the characteristics of the communication regions in the positive half of the powerline cycle may be approximately the same as the characteristics of the corresponding communication regions in the negative half of the powerline cycle. For convenience, the communication regions are depicted with suffixes A and B to distinguish between the communication regions in the positive half and the negative half of the powerline cycle. In FIG. 1B, the positive half of the powerline cycle is divided into five communication regions 152A, 154A, 156A, 158A, and 160A. The negative half of the powerline cycle is divided into five communication regions 152B, 154B, 156B, 158B, and 160B. In one example, the beamforming parameters generated for the communication region 152A may also be used in the communication region 152B. In the description of FIG. 1B, the communication regions 152A and 152B may be considered as the same communication region and may be collectively referred to as communication region 152. Likewise, the communication regions 154A and 154B may be collectively referred to as communication region 154; and so on. However, in other embodiments, the number, duration, and/or characteristics of communication regions in the positive half of the powerline cycle may be different from the number, duration, and/or characteristics of communication regions in the negative half of the powerline cycle.

Because of the time-varying characteristics of the powerline network and the noise on the powerline network, each communication region 152, 154, 156, 158, and 160 may have a different noise profile, different signal-to-noise ratio (SNR), different channel characteristics, and a different tone map. The tone map may refer to communication parameters used for communication between the network devices 102 and 104. The tone map may include the number of bits that can be transmitted on each communication sub-carrier ("bit loading information"), beamforming parameters for each communication sub-carrier, coding rate, guard interval, transmit power spectral density, inter-frame spacing, etc.

The beamforming parameters of a communication region are typically influenced by the frequency characteristics of a PLC channel and the noise that is synchronous to the powerline cycle. To enable the network device 102 to transmit information to the network device 104, the network device 104 may estimate beamforming parameters for each communication region for the network device 102. The packet generation unit 108 of the network device 102 may generate and transmit packets including predefined training sequences ("sounding messages") to the network device 104. The beamforming parameter estimation unit 114 may use the received sounding messages to estimate initial beamforming parameters for each communication region. The front-end transceiver unit 112 may transmit the initial beamforming parameters from the network device 104 to the front-end transceiver unit 106 of the network device 102. The packet generation unit 108 may apply the initial beamforming parameters to each data stream and communication sub-carrier to generate data packets for transmission to the network device 104. For example, for each communication region, the packet generation unit 108 may distribute input data bits across multiple communication sub-carriers based on the bit loading information associated with the communication region. For each communication region, the packet generation unit 108 may further combine the initial beamforming parameters with the input data bits (or one or more data symbols) to generate the data packets. The front-end transceiver unit 106 may then transmit the data packets from the network device 102 to the network device 104. As depicted in the example of FIG. 1B, information is transmitted during the communication regions 152, 154, 156, 158, and 160 of each powerline cycle 150A, 150B, etc. This information may include sounding messages transmitted by the network device 102, data packets transmitted by the network device 102, and/or beamforming parameters transmitted by the network device 104.

The beamforming parameter estimation unit 114 may identify the data packets that were transmitted during each of the communication regions. For each communication region, the beamforming parameter estimation unit 114 may determine coarse beamforming parameters using the frame control field of the data packet that was received using the initial beamforming parameters. For each communication region, the beamforming parameter estimation unit 114 may determine a difference parameter based, at least in part, on the initial beamforming parameters and the coarse beamforming parameters. In one example, the beamforming parameter estimation unit 114 may determine the absolute value of the difference between the initial beamforming parameters and the coarse beamforming parameters for multiple communication sub-carriers. The beamforming parameter estimation unit 114 may determine the average of the absolute values to yield the difference parameter. Other techniques for determining the difference parameter will be further described in FIG. 4.

In some embodiments, the beamforming parameter estimation unit 114 may estimate the difference parameter over a subset of communication sub-carriers on which the network devices 102 and 104 are configured to operate. For example, the network devices 102 and 104 may be configured to operate within the 2 MHz-85 MHz frequency band in accordance with the HomePlug AV2 protocol. The 2 MHz-30 MHz frequency band ("low-band") may be shared by legacy PLC devices (e.g., HomePlug AV 1.1 devices) and the HomePlug AV2 devices. The 30 MHz-85 MHz frequency band ("high-band") may include an extended set of communication sub-carriers that may be used by HomePlug AV2 devices. In accordance with power regulations for data transmissions, the network devices 102 and 104 may be designed to use a low transmit power for transmissions in the high-band and pre-defined communication sub-carriers in the low-band (e.g., communication sub-carriers that are used for amateur radio transmissions). The remaining communication sub-carriers in the low-band may be referred to as "high power carriers in the low-band." In some embodiments, the beamforming parameter estimation unit 114 may use some or all of the high power carriers in the low-band to estimate the difference parameter. In other embodiments, the beamforming parameter estimation unit 114 may use any suitable communication sub-carriers in the low-band and/or the high-band to estimate the difference parameter. The number and position of communication sub-carriers that are used to determine the difference parameter may be configurable.

For each communication region, the beamforming parameter estimation unit 114 may compare the difference parameter with a difference threshold. If the difference parameter for a first communication region exceeds the difference threshold, the beamforming parameter estimation unit 114 can infer a change in the PLC channel condition in the first communication region. The beamforming parameter estimation unit 114 can determine to modify or recalculate the beamforming parameters for the first communication region if the corresponding difference parameter exceeds the difference threshold. In one embodiment, the beamforming parameter estimation unit 114 may transmit the coarse beamforming parameters associated with the first communication region (determined using the frame control field of the data packet) from the network device 104 to the network device 102. In this embodiment, the beamforming parameter estimation unit 114 designates the previously determined coarse beamforming parameters as the modified beamforming parameters for the first communication region. The network device 102 can use the modified beamforming parameters (which are the coarse beamforming parameters in this embodiment) to transmit subsequent data packets to the network device 104 in the first communication region. In another embodiment, the beamforming parameter estimation unit 114 can invalidate the beamforming parameters associated with the first communication region and prompt the network device 102 to restart the sounding process for the first communication region. The network device 102 may retransmit the sounding messages in the first communication region to allow the network device 104 to re-estimate the beamforming parameters associated with the first communication region. The network device 102 may continue to transmit data packets in the remaining communication regions using the existing beamforming parameters associated with each of the remaining communication regions. Operations of the network devices 102 and 104 for adapting beamforming parameters for one or more communication regions are further described with reference to FIGS. 3-5.

Figure 2A:
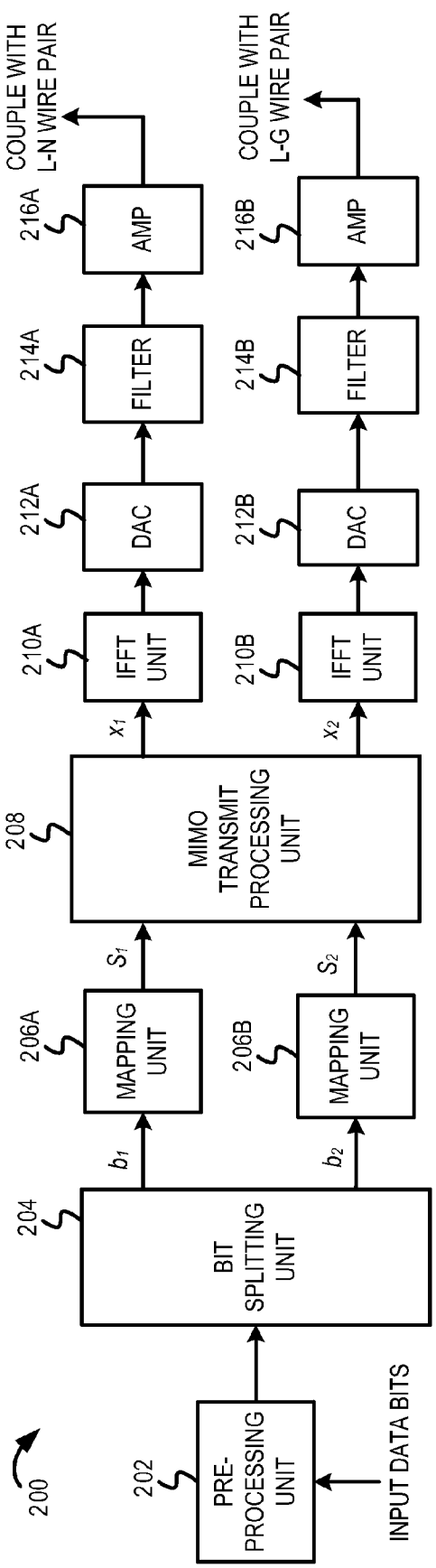
FIG. 2A is a block diagram illustrating an example transmitting PLC device.
Figure 2B:
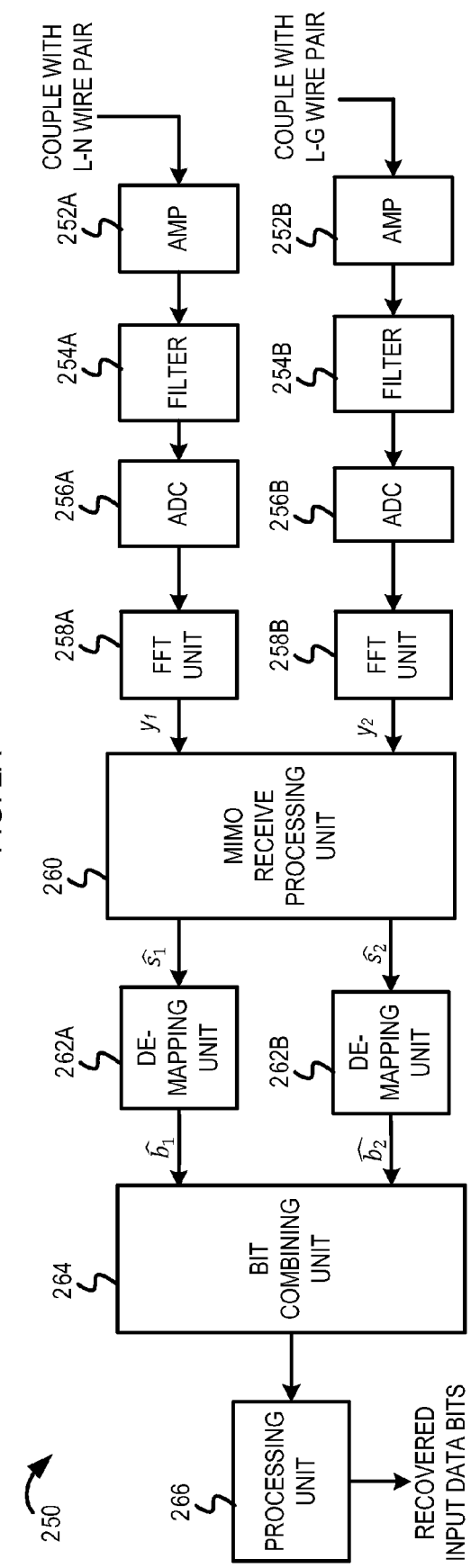
FIG. 2B is a block diagram illustrating an example receiving PLC device.

FIG. 2A is a block diagram illustrating an example OFDM transmitting PLC device 200 configured to implement MIMO communication. FIG. 2B is a block diagram illustrating an example OFDM receiving PLC device 250 configured to implement MIMO communication. For example, the network device 102 of FIG. 1A may be configured as the transmitting PLC device 200; while the network device 104 may be configured as the receiving PLC device 250. The transmitting PLC device 200 includes a pre-processing unit 202, a bit splitting unit 204, mapping units 206A and 206B, a MIMO transmit processing unit 208, inverse fast Fourier transform (IFFT) units 210A and 210B, digital-to-analog conversion (DAC) units 212A and 212B, filter units 214A and 214B, and amplifier units ("amp") 216A and 216B. In the example of FIG. 2A, the transmitting PLC device 200 includes two transmit paths and generates two data streams from the input data bits for transmission via two transmit ports (e.g., an L-N transmit port and an L-G transmit port). However, embodiments are not so limited. In other embodiments, the transmitting PLC device 200 may include any suitable number of transmit paths, generate any suitable number of data streams, and consequently transmit the data streams from any suitable number of transmit ports (e.g., an L-N transmit port, an L-G transmit port, and/or an N-G transmit port).

In FIG. 2A, the pre-processing unit 202 may include a forward error correction (FEC) unit and an interleaving unit. The FEC unit may encode the input data bits to be transmitted. Next, the interleaving unit may interleave the encoded input data bits to minimize frequency-selective fading and interference. The bit-splitting unit 204 may divide the resultant input bit stream into two sub-streams $b_1$ and $b_2$. Each bit stream is provided to a corresponding independent mapping unit 206A and 206B. The mapping units 206A and 206B may modulate the input bits in their respective bit stream onto constellation symbols. Each of the mapping units 206A and 206B may convert an input bit stream into a symbol stream, such that the number of symbols is lower than or equal to the number of bits. In some embodiments, the mapping unit 206A and the mapping unit 206B may use the same modulation scheme (and consequently, constellation set) to map the input bit stream to a symbol stream. In other embodiments, the mapping unit 206A and the mapping unit 206B may each use a different modulation scheme to map the input bit stream to a symbol stream. If $S_1(k)$ and $S_2(k)$ represent the first symbol stream and the second symbol stream transmitted on sub-carrier k of the OFDM system, the two symbol streams may be represented a symbol stream vector S(k), as shown in Eq. 1.

$$\underline{S}(k) = \begin{bmatrix} S_1(k) \\ S_2(k) \end{bmatrix}$$   Eq. 1

The resultant symbol streams $S_1$ and $S_2$ may be provided to the MIMO transmit processing unit 208. The MIMO transmit processing unit 208 may implement functionality for spatial multiplexing, beamforming, space-time coding, etc. In some embodiments, the packet generation unit 108 and 116 in FIG. 1A may each include the pre-processing unit 202, the bit splitting unit 204, the mapping units 206A and 206B, the MIMO transmit processing unit 208, and/or additional units for applying an appropriate tone map for data transmission in each communication region. As will be further described in FIGS. 3-5, the packet generation unit 108 may apply the appropriate beamforming parameters to generate a data packet (or a sounding message) in an appropriate communication region and along each transmit path. In some embodiments, the MIMO transmit processing unit 208 may determine a transmit stream vector, $\underline{x}(k)$ by multiplying the symbol stream vector $\underline{S}(k)$ by beamforming matrix V(k), as depicted in Eq. 2. The transmit stream vector $\underline{x}(k)$ represents the data streams that will be transmitted by the transmitting PLC device 200 and are represented by Eq. 3.

$$\underline{x}(k) = V(k)\underline{S}(k)$$   Eq. 2

$$\underline{x}(k) = \begin{bmatrix} x_1(k) \\ x_2(k) \end{bmatrix}$$   Eq. 3

In some embodiments, beamforming matrix V for communication sub-carrier k maybe represented in terms of beamforming angles, $\psi$ and $\theta$, as depicted with reference to Eq. 4.

$$V(k) = \begin{bmatrix} 1 & 0 \\ 0 & e^{j\psi(k)} \end{bmatrix} \begin{bmatrix} \cos\theta(k) & \sin\theta(k) \\ -\sin\theta(k) & \cos\theta(k) \end{bmatrix}$$   Eq. 4

In some embodiments, the front-end transceiver units 106 and 112 may each include the IFFT units 210A and 210B, the DAC units 212A and 212B, the filter units 214A and 214B, and/or the amplifier units 216A and 216B. The transmit streams $x_1$ and $x_2$ at the output of the MIMO transmit processing unit 208 are provided to IFFT units 210A and 210B. The IFFT units 210A and 210B convert the respective frequency-domain symbol stream to a time-domain signal. The output of the IFFT units 210A and 210B is provided to corresponding DAC units 212A and 212B for digital-to-analog conversion, filter units 214A and 214B, and amplifier units 216A and 216B. In the example of FIG. 2A, the amplifier unit 216A is coupled to the L-N transmit port. The resultant data stream at the output of the amplifier unit 216A may be transmitted from the L-N transmit port onto the L-N PLC channel. The L-N PLC channel may be formed by a line and neutral wire pair of the powerline network. In the example of FIG. 2A, the amplifier unit 216B is coupled to the L-G transmit port. The resultant data stream at the output of the amplifier unit 216B may be transmitted from the L-G transmit port onto the L-G PLC channel. The L-G PLC channel may be formed by a line and ground wire pair of the powerline network. In other embodiments, any suitable transmit ports may be used to transmit the data streams on any suitable number of PLC channels of the powerline network. In some embodiments, the transmitting PLC device may dynamically select the transmit ports for transmitting the data streams. For example, the transmitting PLC device 200 may select the transmit ports based, at least in part, on a performance measurement associated with each of the PLC channels. In another embodiment, the transmit ports that should be used for transmitting the data streams may be predetermined. In another embodiment, the transmitting PLC device 200 may negotiate with the receiving PLC device 250 to select the transmit ports. In another embodiment, the transmitting PLC device 200 may receive a notification from the receiving PLC device 250 identifying the transmit ports that should be used to transmit the data streams.

The receiving PLC device 250 of FIG. 2B includes amplifier units 252A and 252B, filter units 254A and 254B, analog-to-digital conversion (ADC) units 256A and 256B, FFT units 258A and 258B, a MIMO receive processing unit 260, de-mapping units 262A and 262B, a bit combining unit 264, and a processing unit 266. In the example of FIG. 2B, the receiving PLC device 250 includes two receive paths and receives two data streams from two receive ports (e.g., an L-N receive port and an L-G receive port). However, embodiments are not so limited. In other embodiments, the receiving PLC device 250 may include any suitable number of receive paths and may receive data streams from any suitable number of receive ports (e.g., an L-N receive port, an L-G receive port, and/or an N-G receive port).

In the example of FIG. 2B, the receiving PLC device 250 receives two data streams—a first data stream at an L-N receive port and a second data stream at an L-G receive port. In other embodiments, other suitable receive ports may be used to receive the data streams from the powerline network. The data stream received from the L-N PLC channel may be provided to the amplifier unit 252A; while the data stream received from the L-G PLC channel may be provided to the amplifier unit 252B. The output of the amplifier units 252A and 252B may be provided to the corresponding filter units 254A and 254B, ADC units 256A and 256B, and FFT units 258A and 258B. The FFT units 258A and 258B may convert the respective time domain signal into a frequency-domain symbol stream. The output of each FFT unit 258A and 258B is provided to the MIMO receive processing unit 260. The MIMO receive processing unit 260 may implement functionality for spatial de-multiplexing and space-time decoding.

The received symbol vector $\underline{y}(k)$ at the input of the MIMO receive processing unit 260 for the $k^{th}$ communication sub-carrier may be represented by Eq. 5. In Eq. 5, H(k) represents an estimate of the PLC channel between the transmitting and the receiving PLC devices for the $k^{th}$ communication sub-carrier. The MIMO receive processing unit 260 may estimate the PLC channel H(k) based, at least in part, on frame control fields in the received data packets (or sounding messages).

$$\underline{y}(k)=H(k)\underline{x}(k)=H(k)V(k)\underline{s}(k) \qquad \text{Eq. 5}$$

Using the estimated PLC channel H(k) and the previously calculated beamforming parameters V(k), the MIMO receive processing unit 260 may estimate a MIMO equalizer W(k) for the $k^{th}$ communication sub-carrier, as depicted in Eq. 6.

$$W(k)=(V^{*}(k)H^{*}(k)H(k)V(k))^{-1}V^{*}(k)H^{*}(k) \qquad \text{Eq. 6}$$

For each communication sub-carrier, the MIMO receive processing unit 260 may apply the MIMO equalizer to the received symbol stream to yield the resultant symbol stream vector $\underline{\hat{s}}(k)$, as depicted in Eq. 7.

$$\underline{\hat{s}}(k)=W(k)\underline{y}(k) \qquad \text{Eq. 7}$$

In the example of FIG. 2B, the resultant symbol streams $\hat{s}_1$ and $\hat{s}_2$ at the output of the MIMO receive processing unit 260 may be provided to de-mapping units 262A and 262B. The de-mapping units 262A and 262B may convert the symbol streams $\hat{s}_1$ and $\hat{s}_2$ to corresponding bit streams $\hat{b}_1$ and $\hat{b}_2$. Based on knowledge of the modulation scheme employed at the transmitting PLC device 200, the de-mapping units 262A and 262B can execute demodulation operations to generate the bit streams $\hat{b}_1$ $\hat{b}_2$. The bit streams $\hat{b}_1$ and $\hat{b}_2$ are then provided to the bit combining unit 264. The bit combining unit 264 may combine the bit streams $\hat{b}_1$ and $\hat{b}_2$ to yield a combined bit stream. The processing unit 266 may include an FEC decoding unit and a de-interleaving unit. The de-interleaving unit may de-interleave the combined bit stream while the FEC decoding unit may decode the combined bit stream to recover the input data bits originally transmitted by the PLC device 200.

In some embodiments, the front-end transceiver units 106 and 112 may each include the amplifier units 252A and 252B, the filter units 254A and 254B, the ADC units 256A and 256B, the FFT units 258A and 258B. The beamforming parameter estimation units 110 and 114 may each include the MIMO receive processing unit 260, the de-mapping units 262A and 262B, the bit combining unit 264, the processing unit 266, and/or additional functionality described in FIGS. 1A and 3-5 for estimating and adapting the beamforming parameters for the transmitting PLC device. The beamforming parameter estimation unit 114 may estimate the MIMO PLC channel between the transmitting PLC device 200 and the receiving PLC device 250 based, at least in part, on sounding messages received from the transmitting PLC device 200. The beamforming parameter estimation unit 114 may calculate the beamforming matrix V(k) from the estimated MIMO PLC channel. More generally, the beamforming parameter estimation unit 114 may estimate initial beamforming parameters for each communication region in the powerline cycle based, at least in part, on sounding messages received from the transmitting PLC device 200. The beamforming parameter estimation unit 114 may determine whether to modify the initial beamforming parameters for one or more communication regions based, at least in part, on the difference between the initial beamforming parameters and coarse beamforming parameters associated with each of the communication regions.

Although not described above, in some embodiments, functionality of the packet generation unit 108 (or 116) for generating the data packet may be included in the MIMO transmit processing unit 208. In some embodiments, all the components 202-216B of the transmitter PLC device 200 may be included in the front-end transceiver units 106 and 112. In some embodiments, functionality of the beamforming parameter estimation unit 114 for estimating and adapting the beamforming parameters may be included in the MIMO receive processing unit 260. In this embodiment, the operations for estimating and adapting the beamforming parameters may be executed prior to decoding the input data bits. In other embodiments, the functionality of the beamforming parameter estimation unit 114 for estimating and adapting the beamforming parameters may be included in the processing unit 266. In this embodiment, the operations for estimating and adapting the beamforming parameters may be executed after decoding the input data bits. Furthermore, in some embodiments, some or all of the components depicted in FIGS. 2A and 2B may be included in the front-end transceiver units 106 and 112.

Figure 3:
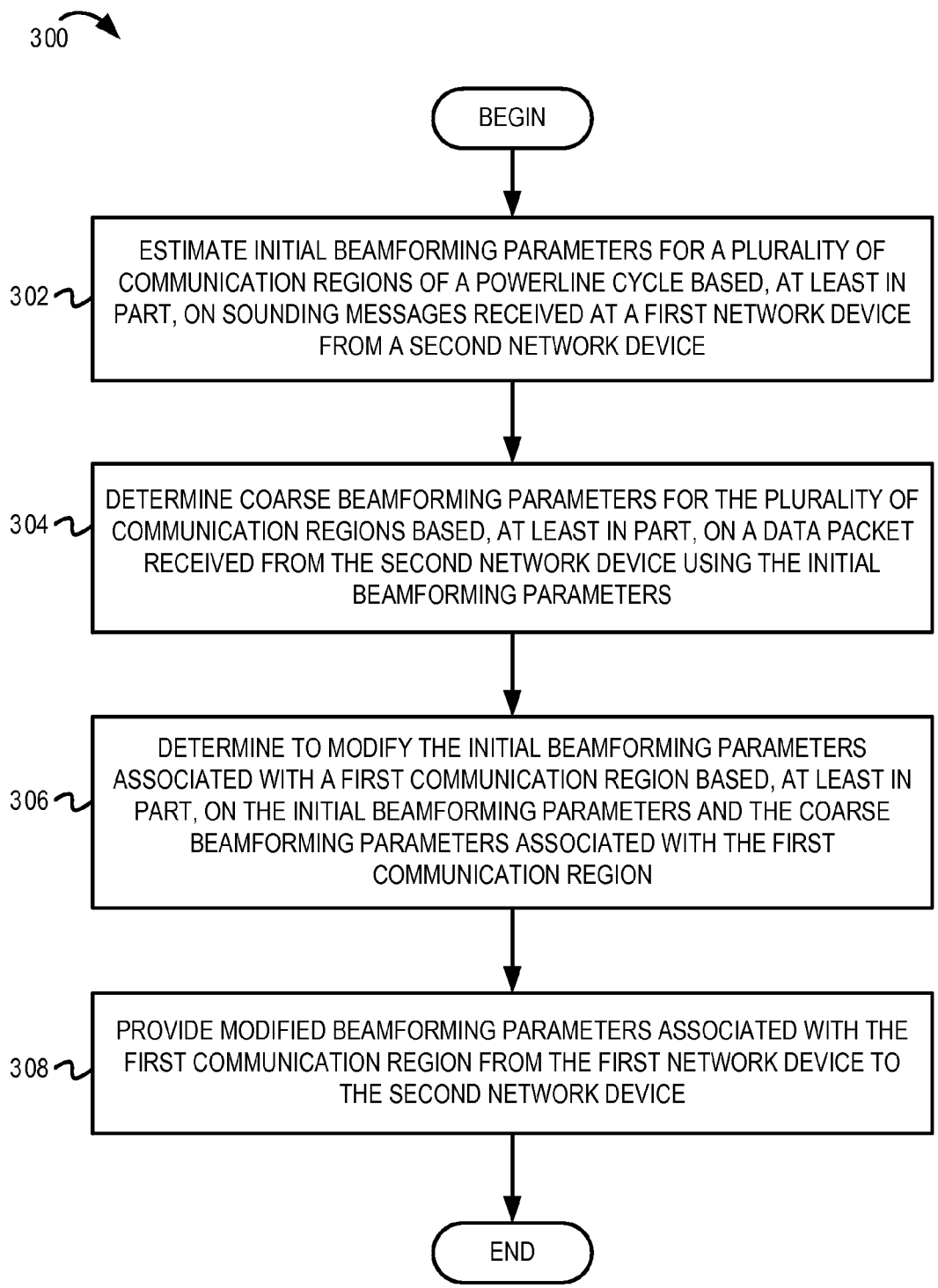
FIG. 3 is a flow diagram illustrating example operations for adapting beamforming parameters in a PLC network.

FIG. 3 is a flow diagram ("flow") 300 illustrating example operations for adapting beamforming parameters in a PLC network. The flow 300 begins at block 302.

At block 302, a first network device estimates initial beamforming parameters for a plurality of communication regions of a powerline cycle based, at least in part, on sounding messages received from a second network device. In some embodiments, the first network device and the second network device may each be PLC-capable devices that implement PLC protocols (e.g., HomePlug AV/AV2/GreenPHY, IEEE 1905). In other embodiments, the first network device and the second network device may be configured to implement other suitable wired communication protocols (e.g., Ethernet, MoCA, etc.) and/or wireless communication protocols (e.g., WLAN). In some embodiments, each half of the powerline cycle (e.g., a 50 Hz/60 Hz powerline cycle) may be divided into multiple communication regions. In some embodiments, each of the communication regions may have the same time interval. In other words, the duration associated with each communication region may be equal. In other embodiments, some or all of the communication regions may have a different time interval. With reference to the example of FIG. 1A, the front-end transceiver unit 112 of the first network device 104 may receive the sounding messages from the front-end transceiver unit 106 of the second network device 102. In some embodiments, the number of sounding messages transmitted by the second network device may be preconfigured. In another embodiment, the first network device and the second network device may negotiate and agree upon the number of sounding messages that should be exchanged for estimating beamforming parameters.

Figure 4:
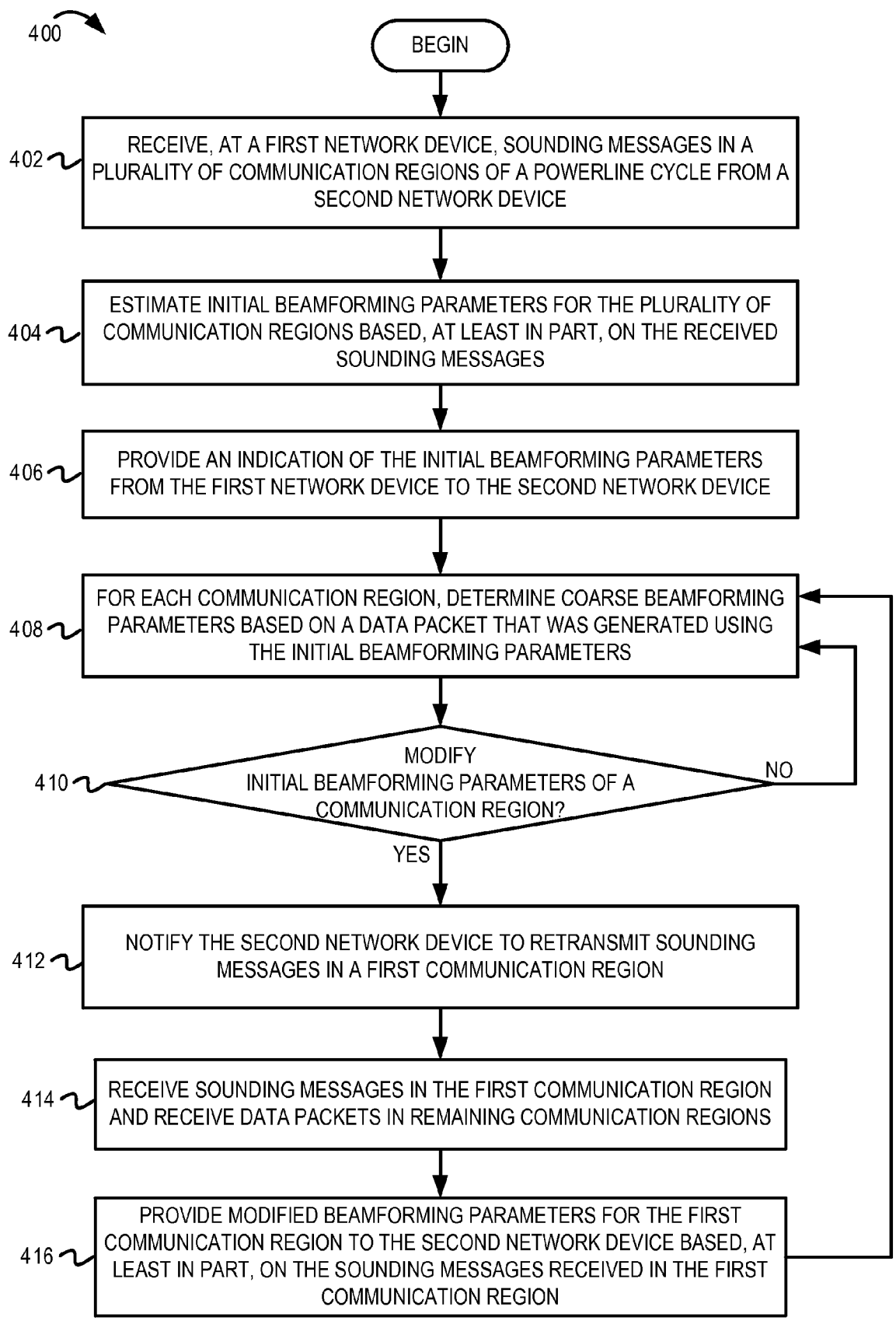
FIG. 4 is a flow diagram illustrating example operations of a receiving network device for adapting beamforming parameters.

As will be further described in FIG. 4, the beamforming parameter estimation unit 114 may use the sounding messages to estimate a MIMO communication channel between the first network device and the second network device in each of the communication regions. The beamforming parameter estimation unit 114 may then estimate the beamforming parameters for each of the communication regions based, at least in part, on the MIMO communication channel estimate for the communication region. The flow continues at block 304.

At block 304, the first network device determines coarse beamforming parameters for the plurality of communication regions based, at least in part, on a data packet received from the second network device using the initial beamforming parameters. For example, the second network device may generate and transmit a data packet in the first communication region using the initial beamforming parameters associated with the first communication region. The beamforming parameter estimation unit 114 of the first network device may determine coarse beamforming parameters for the first communication region based, at least in part, on the data packet(s) received during the first communication region, as will be further described below in FIG. 4. For example, the beamforming parameter estimation unit 114 may estimate the MIMO communication channel in the first communication region from a frame control field of the received data packet. The beamforming parameter estimation unit 114 may then determine the coarse beamforming parameters for the first communication region from the MIMO communication channel estimate. The flow continues at block 306.

At block 306, the first network device determines to modify the initial beamforming parameters associated with the first communication region based, at least in part, on the initial beamforming parameters and the coarse beamforming parameters associated with the first communication region. As will be further described below in FIG. 4, the beamforming parameter estimation unit 114 may calculate a difference parameter for the first communication region based, at least in part, on the initial beamforming parameters associated with the first communication region and the coarse beamforming parameters associated with the first communication region. The difference parameter may be calculated using: A) channel estimates determined using the sounding messages and the data packets received in the first communication region, B) signal-to-noise-ratio (SNR) determined using the sounding messages and the data packets received in the first communication region, C) beamforming angles determined using the sounding messages and the data packets received in the first communication region, and/or other suitable parameters. The beamforming parameter estimation unit 114 may compare the difference parameter associated with the first communication region with a difference threshold. If the difference parameter exceeds the difference threshold, the beamforming parameter estimation unit 114 may determine to modify the initial beamforming parameters associated with the first communication region. If the difference parameter does not exceed the difference threshold, the beamforming parameter estimation unit 114 may determine not to modify the initial beamforming parameters associated with the first communication region. In other words, the first network device may continue to receive data packets in the first communication region using the initial beamforming parameters associated with the first communication region. The flow continues at block 308.

At block 308, the first network device provides modified beamforming parameters associated with the first communication region to the second network device. Various techniques can be employed for determining the modified beamforming parameters. In one embodiment, the first network device may invalidate the initial beamforming parameters associated with the first communication region and may prompt the second network device to restart the sounding process in the first communication region. In other words, the first network device may notify the second network device to retransmit the sounding messages in the first communication region. The first network device may also prompt the second network device to continue transmitting the data packets in the remaining communication regions using the corresponding beamforming parameters. In another embodiment, the beamforming parameter estimation unit 114 may transmit the coarse beamforming parameters determined at block 304 using the data packet received in the first communication region. From block 308, the flow ends.

FIG. 4 is a flow diagram 400 illustrating example operations of a receiving network device for adapting beamforming parameters. The flow begins at block 402.

At block 402, a first network device receives sounding messages from a second network device in a plurality of communication regions of a powerline cycle. In some embodiments, the first network device and the second network device may each be PLC-capable devices that implement PLC protocols (e.g., HomePlug AV/AV2/GreenPHY, IEEE 1905). In other embodiments, the first network device and the second network device may be configured to implement other suitable wired communication protocols (e.g., Ethernet, MoCA, etc.) and/or wireless communication protocols (e.g., WLAN).

The first network device may estimate the beamforming parameters for the second network device by executing a sounding process and prompting the second network device to transmit sounding messages. A sounding message typically includes a preamble field for synchronization and packet detection. The sounding message also includes a frame control field that describes header information, such as a source address, a destination address, packet length, packet type, modulation and code rate, etc. For example, the packet type may indicate a HomePlug AV 2.0 MIMO sound payload. The sounding message also includes a payload field including a predefined data sequence (also referred to as training sequence). The training sequence transmitted in the sounding messages may be predefined based, at least in part, on the communication protocols implemented by the first and the second network devices. In some embodiments, the payload field of the sounding message may include repeating pairs of symbols, some of them negated in sign, so that an orthogonal pair of symbols is transmitted across the multiple transmit ports. In a MIMO OFDM PLC network, the first network device may transmit the sounding messages on a plurality of communication sub-carriers and from multiple transmit ports, as described with reference to FIG. 1A. For example, if the sounding messages are transmitted from an L-N transmit port and an L-G transmit port, then each sounding message represents a transmission on each communication sub-carrier of an L-N communication channel and a transmission on each communication sub-carrier of an L-G communication channel. The flow continues at block 404.

At block 404, the first network device estimates initial beamforming parameters for the plurality of communication regions based, at least in part, on the received sounding messages. The beamforming parameters may be used to weight data (e.g., one or more data symbols) transmitted in a multi-stream or multi-transmitter environment to compensate for channel variations or noise. Techniques for weighting data to compensate for channel variations or noise are also referred to as "pre-coding." The beamforming parameters may be determined based, at least in part, on characteristics of the MIMO communication channel between the first network device and the second network device. The first network device may use the received sounding messages and knowledge of the training sequence to estimate the MIMO communication channel (H) between the first network device and the second network device. The MIMO communication channel can represent communication paths between multiple transmit ports of the second network device and multiple receive ports of the first network device. Referring to the above example, where the sounding messages are transmitted on the L-N communication channel and the L-G communication channel, the first network device may estimate a 2×2 channel matrix for each communication sub-carrier of the composite L-N and L-G communication channels. The first network device may determine a 2×2 beamforming matrix for each communication sub-carrier from the channel matrix. The beamforming parameters may include a collection of the beamforming matrices for each communication sub-carrier. For example, the first network device may estimate the beamforming matrix (V) through an eigen-value decomposition (or singular value decomposition) of the MIMO communication channel (H). In other embodiments, the beamforming parameter estimation unit 114 may use other suitable techniques to determine the initial beamforming parameters. In some embodiments, the beamforming matrix V for communication sub-carrier k maybe represented in terms of beamforming angles, $\psi$ and $\theta$, as depicted above with reference to Eq. 4.

In some embodiments, the beamforming parameter estimation unit 114 of the network device 104 may first estimate common beamforming parameters to enable the network device 102 to transmit subsequent data packets. In some embodiments, the beamforming parameter estimation unit 114 may determine the channel information across the entire powerline cycle (e.g., across all the communication regions) and may average the SNR information across the powerline cycle. The beamforming parameter estimation unit 114 may estimate the common beamforming parameters for the second network device using the information determined and averaged across the entire powerline cycle, instead of on a region-by-region basis. After determining the common beamforming parameters, the beamforming parameter estimation unit 114 may refine the common beamforming parameters for each communication region. After one or more iterations of refining the beamforming parameters, some or all of the communication regions may be associated with different beamforming parameters. In this embodiment, the initial beamforming parameters associated with each communication region may refer to beamforming parameters associated with an existing tone map that is being used to transmit data packets in a corresponding communication region. In other embodiments, however, the first network device may receive sounding messages in each communication region. The first network device can estimate the MIMO communication channel and the initial beamforming parameters for each communication region. The flow continues at block 406.

At block 406, the first network device provides an indication of the initial beamforming parameters to the second network device. For example, the beamforming parameter estimation unit 114 may provide the initial beamforming parameters to the front-end transceiver unit 112. The front-end transceiver unit 112, in turn, may transmit the initial beamforming parameters to the second network device. The packet generation unit 108 of the second network device 102 may use the initial beamforming parameters to transmit subsequent data packets in the plurality of communication regions. The flow continues at block 408.

At block 408, the first network device determines coarse beamforming parameters for each communication region based, at least in part, on a data packet that was generated using the initial beamforming parameters associated with the communication region. For example, the front-end transceiver unit 112 may receive data packets using the initial beamforming parameters. The packet generation unit 108 of the second network device may distribute input data bits across the plurality of communication sub-carriers based on corresponding bit loading information. For each communication region, the second network device may combine the initial beamforming parameters with the data bits (or data symbols) to minimize noise and interference effects on the PLC channel between the first network device and the second network device.

A data packet typically includes a preamble field for packet detection and synchronization, frame control fields for packet decoding, and a payload field including information transmitted from the second network device. After receiving the data packet in a first communication region, the beamforming parameter estimation unit 114 may determine coarse beamforming parameters for the first communication region based, at least in part, on the frame control field of the data packet. For example, the beamforming parameter estimation unit may estimate the MIMO communication channel in the first communication region using data symbols transmitted in the frame control field. The beamforming parameter estimation unit 114 may then determine the coarse beamforming parameters for the first communication region using the MIMO communication channel estimate, as described above in block 404. For each communication region, the beamforming parameter estimation unit 114 can use the initial beamforming parameters and the coarse beamforming parameters to determine whether to modify the initial beamforming parameters for the communication region. The flow continues at block 410.

At block 410, the first network device determines whether to modify the initial beamforming parameters of any of the communication regions based, at least in part, on the initial beamforming parameters and the coarse beamforming parameters associated with each of the communication regions. In some embodiments, the beamforming parameter estimation unit 114 may compare the coarse beamforming parameters determined from the data packet with the initial beamforming parameters determined from the sounding messages. For each communication region, the beamforming parameter estimation unit 114 may calculate a difference parameter that is representative of the difference between the initial beamforming parameters and the coarse beamforming parameters. As will be further described below, in some embodiments, the difference parameter may be determined as an average of the difference between the initial beamforming parameters and the coarse beamforming parameters over multiple communication sub-carriers. In some embodiments, the coarse beamforming parameters may be determined using a single data packet. In other embodiments, the coarse beamforming parameters may be averaged over multiple data packets. A higher value of the difference parameter may represent a larger difference between the initial beamforming parameters and the coarse beamforming parameters. A higher value of the difference parameter may also represent a larger channel change between the time instant at which the sounding message was analyzed and the time instant at which the beamformed data packet was analyzed.

Various techniques can be employed to determine the difference parameter and to determine whether to modify the initial beamforming parameters of a communication region. In some embodiments, the difference parameter may be the average difference between channel estimates determined from the sounding messages and channel estimates determined from the frame control field of the data packet, as depicted by Eq. 8.

$$\text{Difference parameter} = \left\{ \frac{1}{N_C} \sum_{k \in C} |H_{FC}^{i,j}(k) - H_{sound}^{i,j}(k)| \right\} \quad \text{Eq. 8}$$

In Eq. 8, $H_{sound}^{i,j}(k)$ represents the $(i, j)^{th}$ element of an initial channel matrix estimated from the sounding messages for communication sub-carrier k and $H_{FC}^{i,j}(k)$ represents the $(i, j)^{th}$ element of a coarse channel matrix determined from the frame control field of the data packet for communication sub-carrier k. C represents the subset of communication sub-carriers over which the difference parameter is estimated, while $N_C$ represents the number of communication sub-carriers over which the difference parameter is estimated. In some embodiments, the subset of the communication sub-carriers C may be selected from the high power carriers in the low-band. In other embodiments, the subset of the communication sub-carriers C may be selected from the low-band and/or the high-band (e.g., not necessarily the high power communication sub-carriers). With reference to the example of Eq. 8, the difference parameter may be estimated using some or all of the elements of the channel matrices $H_{sound}$ and $H_{FC}$. The resultant difference parameter may be compared with a difference threshold to determine whether to modify the initial beamforming parameters of the corresponding communication region, as will be further described below.

In another embodiment, the difference parameter may be determined as the average difference between the initial beamforming angles determined using the sounding messages (e.g., $\theta_{sound}(k)$ and/or $\psi_{sound}(k)$) and the coarse beamforming angles determined using the frame control field of the data packet ($\theta_{FC}(k)$ and/or $\psi_{FC}(k)$). This is further illustrated in Eq. 9 and Eq. 10.

$$\text{Difference parameter} = \left\{ \frac{1}{N_C} \sum_{k \in C} |\theta_{FC}(k) - \theta_{sound}(k)| \right\} \quad \text{Eq. 9}$$

$$\text{Difference parameter} = \left\{ \frac{1}{N_C} \sum_{k \in C} |\psi_{FC}(k) - \psi_{sound}(k)| \right\} \quad \text{Eq. 10}$$

In another embodiment, the difference parameter may be determined as the average difference between the initial SNR determined using the sounding messages (e.g., $SNR_{sound}(k)$) and the coarse SNR determined using the frame control field of the data packet ($SNR_{FC}(k)$). This is further illustrated in Eq. 11.

$$\text{Difference parameter} = \left\{ \frac{1}{N_C} \sum_{k \in C} |SNR_{FC}(k) - SNR_{sound}(k)| \right\} \quad \text{Eq. 11}$$

In some embodiments, $SNR_{sound}$ may be estimated from non-beamformed sounding messages. The second network device may not apply any beamforming parameters to the training sequence to generate the sounding messages. The sounding messages that are generated without applying beamforming parameters are referred to as "non-beamformed sounding messages." In other embodiments, $SNR_{sound}$ may be estimated from beamformed sounding messages. In one example, the second network device may apply a last known set of beamforming parameters to the training sequence to generate the beamformed sounding messages. More generally, the beamforming parameter estimation unit 114 may estimate the difference parameter associated with each communication region, as depicted in Eq. 12.

$$\text{Difference parameter} = \left\{ \frac{1}{N_C} \sum_{k \in C} |\rho_{FC}(k) - \rho_{sound}(k)| \right\} \quad \text{Eq. 12}$$

In Eq. 12, $\rho_{sound}$ represents an initial generic parameter that is determined using the sounding messages. The first network device may calculate and store the $\rho_{sound}$ parameter after processing sounding messages received from the second network device. The $\rho_{sound}$ parameter may include: A) an estimate of the MIMO communication channel ($H_{sound}$) determined using one sounding message or averaged over multiple sounding messages, B) a beamforming matrix ($V_{sound}$) determined using the sounding messages, C) beamforming angles ($\psi_{sound}$ and $\theta_{sound}$) determined using the sounding messages, D) SNR ($SNR_{sound}$) estimated using the sounding messages, E) other suitable performance measurements (e.g., attenuation level), and/or other combinations thereof. In Eq. 9, $\rho_{FC}$ represents a coarse generic parameter that is determined using the data packet received from the second network device. The second network device may apply the initial beamforming parameters (determined using the sounding messages) to generate the data packet. The first network device may calculate and store the $\rho_{FC}$ parameter after processing the frame control portion of the data packet received from the second network device. The $\rho_{FC}$ parameter may include: A) an estimate of the MIMO communication channel ($H_{FC}$) determined using the frame control field of the beamformed data packet, B) a beamforming matrix ($V_{FC}$) determined using the frame control field of the beamformed data packet, C) beamforming angles ($\psi_{FC}$ and $\theta_{FC}$) determined using the frame control field of the beamformed data packet, D) SNR ($SNR_{FC}$) estimated using the frame control field of the beamformed data packet, E) other suitable performance measurements (e.g., attenuation level), and/or other combinations thereof.

For each communication region, the beamforming parameter estimation unit 114 can compare the difference parameter with a difference threshold. If the difference parameter is not in accordance with the difference threshold, the beamforming parameter estimation unit 114 may determine to update the initial beamforming parameters associated with the communication region. For example, if the difference parameter of a first communication region exceeds a corresponding difference threshold, the beamforming parameter estimation unit 114 may determine to update the initial beamforming parameters associated with the first communication region. If it is determined to modify the initial beamforming parameters of a communication region, the flow continues at block 412. Otherwise, if it is determined not to modify the initial beamforming parameters of any of the communication regions, the flow loops back to block 408, where the first network device continues to determine coarse beamforming parameters and determine whether to modify the beamforming parameters associated with a communication region.

At block 412, the first network device notifies the second network device to retransmit sounding messages in the first communication region. For example, the beamforming parameter estimation unit 114 may invalidate the beamforming parameters associated with the first communication region in response to determining that the difference parameter associated with the first communication region exceeds the difference threshold. In some embodiments, the first network device may transmit a management message (MME) to notify the second network device to restart the sounding process for the first communication region and to retransmit sounding messages in the first communication region. In another embodiment, the first network device may transmit a predefined value in a selective acknowledgement (SACK) message to notify the second network device to restart the sounding process for the first communication region. The management message (and the SACK message) may indicate that the initial beamforming parameters have been invalidated in the first communication region and that the initial beamforming parameters are still valid in the remaining communication regions. As discussed above, the tone map associated with the first communication region includes the beamforming parameters associated with the first communication region. Therefore, invalidating and modifying the beamforming parameters results in invalidating and modifying the tone map. Restarting the sounding process for the first communication region can allow the first network device to estimate modified beamforming parameters for the first communication region. By transmitting the notification, the first network device may prompt the second network device to retransmit the sounding messages in the first communication region and to continue transmitting the data packets in the remaining communication regions using the corresponding initial beamforming parameters. The flow continues at block 414.

At block 414, the first network device receives sounding messages in the first communication region and receives data packets in the remaining communication regions. After transmitting the notification to restart the sounding process at block 412, the first network device may receive non-beamformed or beamformed sounding messages in the first communication region. In the remaining communication regions, the first network device may continue to receive data packets that are generated using the respective initial beamforming parameters. More generally, the first network device may receive the sounding messages in all the communication regions associated with invalidated tone maps. In each of the remaining communication regions, the first network device may receive data packets that are generated using the most recent tone map associated with the communication region. The flow continues at block 416.

At block 416, the first network device provides the modified beamforming parameters associated with the first communication region to the second network device based, at least in part, on the sounding messages received in the first communication region. After the beamforming parameter estimation unit 114 provides the modified beamforming parameters for the first communication region to the second network device, the second network device may use the modified beamforming parameters to transmit subsequent data packets in the first communication region. In some embodiments, if the difference parameter associated with another communication region exceeded the difference threshold, the beamforming parameter estimation unit 114 may invalidate the initial beamforming parameters associated with the next communication region. The beamforming parameter estimation unit 114 may cause the second network device to retransmit the sounding messages in the next communication region and to continue transmitting data packets in the remaining communication regions. From block 416, the flow loops back to block 408 where the first network device continues to determine coarse beamforming parameters and determine whether to modify the beamforming parameters associated with any of the communication regions.

Although FIG. 4 describes the first network device restarting the sounding process for the first communication region if the difference parameter associated with the first communication region is not in accordance with the difference threshold, embodiments are not so limited. In other embodiments, other suitable techniques can be employed for determining the modified beamforming parameters if the difference parameter associated with the first communication region is not in accordance with the difference threshold. For example, the beamforming parameter estimation unit 114 may designate the previously determined coarse beamforming parameters associated with the first communication region as the modified beamforming parameters associated with the first communication region. The beamforming parameter estimation unit 114 may transmit the coarse beamforming parameters associated with the first communication region to the second network device. For example, if the beamforming parameter estimation unit 114 determines that the beamforming angle difference parameter determined using Equations 9 and 10 exceeds a threshold beamforming angle, the beamforming parameter estimation unit 114 may designate the coarse beamforming angles ($\psi_{FC}$ and $\theta_{FC}$) determined for each communication sub-carrier of the first communication region as the modified beamforming parameters associated with the first communication region. The beamforming parameter estimation unit 114 may then transmit the coarse beamforming angles ($\psi_{FC}$ and $\theta_{FC}$) determined for each communication sub-carrier of the first communication region to the second network device. As another example, if the beamforming parameter estimation unit 114 determines that the SNR difference parameter determined using Eq. 11 exceeds a threshold SNR, the beamforming parameter estimation unit 114 may transmit the coarse beamforming angles ($\psi_{FC}$ and $\theta_{FC}$) determined for each communication sub-carrier of the first communication region to the second network device. The second network device can use the modified beamforming parameters (which are the coarse beamforming parameters in this embodiment) to transmit subsequent data packets to first the network device in the first communication region.

Figure 5:
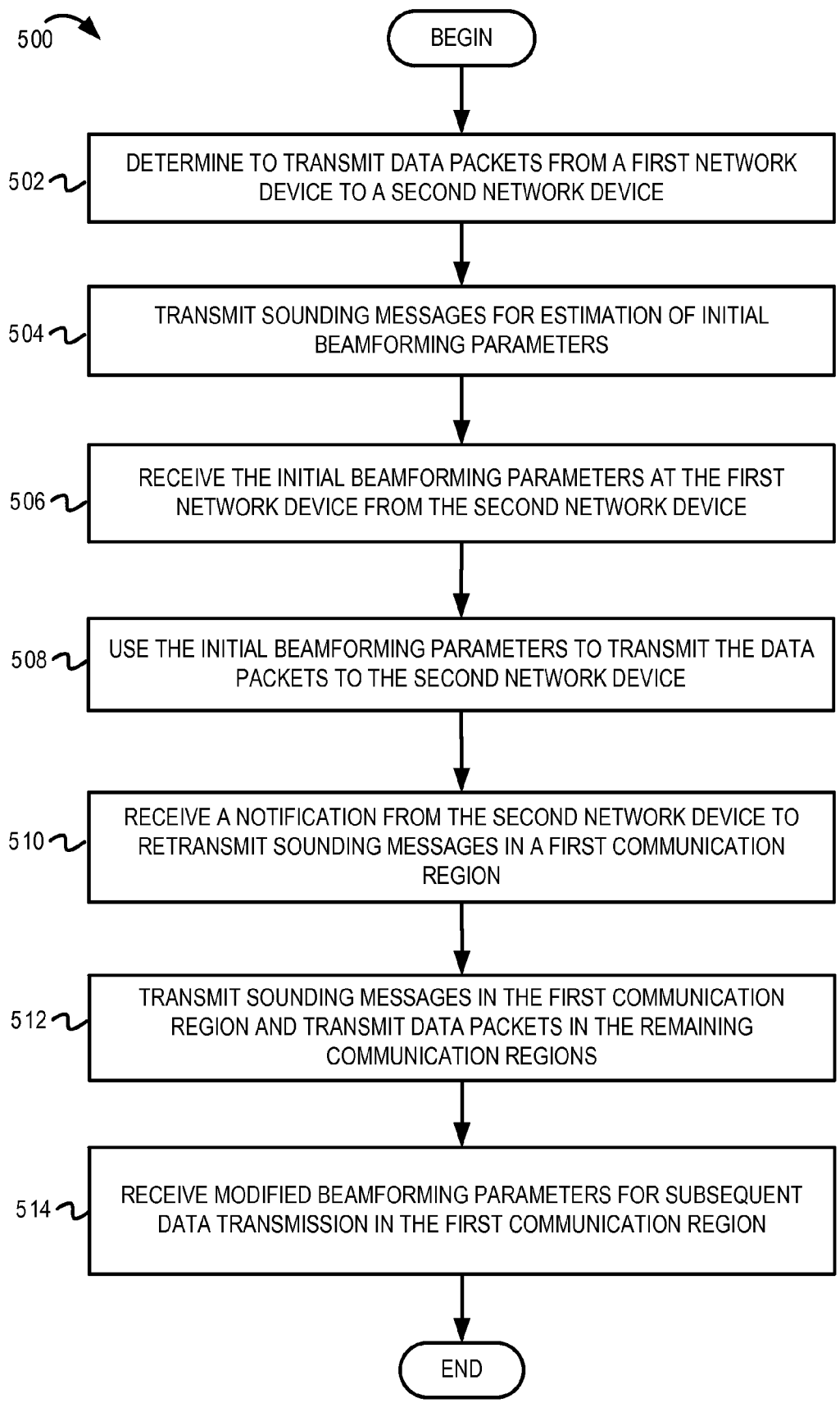
FIG. 5 is a flow diagram illustrating example operations of a transmitting network device for adapting beamforming parameters.

FIG. 5 is a flow diagram 500 illustrating example operations of a transmitting network device for adapting beamforming parameters. The flow 500 begins at block 502.

At block 502, a first network device determines to transmit data packets to a second network device of a communication network. With reference to the example of FIG. 1A, the network device 102 may determine to transmit application data to the network device 104. In some embodiments, the first network device and the second network device may each be PLC-capable devices that implement PLC protocols (e.g., HomePlug AV/AV2/GreenPHY, IEEE 1905). In other embodiments, the first network device and the second network device may be configured to implement other suitable wired communication protocols (e.g., Ethernet, MoCA, etc.) and/or wireless communication protocols (e.g., WLAN). The flow continues at block 504.

At block 504, the first network device transmits sounding messages to enable the second network device to estimate initial beamforming parameters for the first network device. For example, the packet generation unit 108 of the network device 102 may generate non-beamformed sounding messages without applying any beamforming parameters to a predefined training sequence. As another example, the packet generation unit 108 may generate beamformed sounding messages by applying a set of most recent beamforming parameters to the predefined training sequence. The predefined training sequence that is transmitted in the sounding messages may be determined based, at least in part, on the communication protocol being implemented at the first network device and the second network device. The flow continues at block 506.

At block 506, first network device receives the initial beamforming parameters from the second network device. For example, the front-end transceiver unit 106 may receive the initial beamforming parameters from the second network device. As described above with reference to FIGS. 3 and 4, the second network device may determine the initial beamforming parameters for each communication region of the powerline cycle. For each communication region, the initial beamforming parameters may be determined based, at least in part, on sounding messages transmitted in the communication region. For each communication sub-carrier of each communication region, the beamforming parameters may include weighting factors that should be applied to data streams subsequently transmitted from the first network device. The flow continues at block 508.

At block 508, the first network device uses the initial beamforming parameters to transmit the data packets to the second network device. For example, the packet generation unit 108 may generate the data packets using the initial beamforming parameters. For each communication region, the packet generation unit 108 may combine the initial beamforming parameters with the input data bits (or data symbols) to generate the data packets. The front-end transceiver unit 106 may then transmit the data packets from the first network device to the second network device from multiple transmit ports and over multiple communication sub-carriers. The flow continues at block 510.

At block 510, the first network device receives a notification from the second network device to retransmit the sounding messages in a first communication region. As described above with reference to FIGS. 3-4, the second network device may determine whether to modify the initial beamforming parameters associated with any of the communication regions based, at least in part, on data packets that are transmitted during the corresponding communication region. The first network device may receive a notification to retransmit the sounding messages in the first communication region. The notification may indicate that the coarse beamforming parameters that were determined using the data packets in the first communication region are substantially different from the initial beamforming parameters that were determined using the sounding messages in the first communication region. The notification may also indicate that the initial beamforming parameters have been invalidated in the first communication region but that the initial beamforming parameters are still valid in the remaining communication regions. The flow continues at block 512.

At block 512, the first network device transmits the sounding messages in the first communication region and transmits data packets in the remaining communication regions. In some embodiments, the first network device may transmit the non-beamformed sounding messages in the first communication region. In another embodiment, the first network device may use the initial beamforming parameters to transmit beamformed sounding messages in the first communication region. The first network device may continue to transmit the data packets using the initial beamforming parameters in the remaining communication regions. This can allow the first and the second network devices to continue to exchange application data while estimating the beamforming parameters for the first communication region. More generally, the second network device may invalidate the beamforming parameters (and consequently a tone map) associated with one or more communication regions. The first network device may transmit the sounding messages in the communication regions associated with the invalidated tone map. For each of the remaining communication regions, the first network device may continue transmitting data packets generated using the most recent tone map associated with the communication region. The flow continues at block 514.

At block 514, the first network device receives modified beamforming parameters for subsequent data transmission in the first communication region. The first network device and the second network device may execute similar operations as described above in blocks 504 and 506 to determine the modified beamforming parameters for the first communication region. The first network device may transmit data packets using the modified beamforming parameters in the first communication region and may transmit data packets using the appropriate initial beamforming parameters in the remaining communication regions. From block 514, the flow ends.

Although FIG. 5 depicts the flow 500 ending after block 514, embodiments are not so limited. In other embodiments, the first network device may continue transmitting data packets in each communication region using the most recent beamforming parameters associated with each communication region. If the first network device receives another notification from the second network device identifying a communication region that should be re-evaluated, the first network device can retransmit the sounding messages in the identified communication region. The first network device can continue to transmit the data packets in the remaining communication regions using the corresponding most recent beamforming parameters.

It should be understood that FIGS. 1A-5 are examples meant to aid in understanding embodiments and should not be used to limit embodiments or scope of the claims. Embodiments may comprise additional components, different components, and/or may perform additional operations, fewer operations, operations in a different order, operations in parallel, and some operations differently.

In some embodiments, the parameter $\rho_{sound}$ that is determined using the sounding messages and the parameter $\rho_{FC}$ that is determined using the data packets may be calculated in hardware. In some embodiments, the difference parameter (that is determined using the parameter $\rho_{sound}$ and the parameter $\rho_{FC}$) may be calculated in hardware and stored in a register (or another suitable data structure). A software module (e.g., the medium access control or MAC layer) may access the register and compare the difference parameter to a difference threshold for each data packet or every predetermined number of data packets. In another embodiment, the difference parameter may be calculated in hardware and may also be compared to the difference threshold in hardware. If the difference parameter exceeds the difference threshold, the hardware module may store a first predefined value (e.g., value=1) in a register. Otherwise, if difference parameter does not exceed the difference threshold, the hardware module may store a second predefined value (e.g., value=0) in the register. The software module may read the value in the register and determine whether to modify the beamforming parameters. In some embodiments, the register may be an N-bit register. In this embodiment, the software module may read the register periodically or in response to receiving a data packet. The software module may determine whether the difference parameter exceeds the difference threshold for at least a predetermined number of data packets (e.g., whether a predetermined number of bits of the register have been set to "1"). The first network device may determine to modify the beamforming parameters if the difference parameter exceeds the difference threshold for the predetermined number of data packets. Although, operations describe using software modules and registers for determining whether to modify the beamforming parameters, embodiments are not so limited. In other embodiments, other suitable hardware and/or software components may be used for determining whether to modify the beamforming parameters.

In some embodiments, the network device 104 may execute the above-described operations across all the communication regions to estimate and modify one set of beamforming parameters that are common to all the communication regions. In other embodiments, the network device 104 may execute the above-described operations on a region-by-region basis. In this embodiment, the network device 104 may determine different beamforming parameters for each communication region. In one example of this embodiment, the network device 104 may include an N-bit register for each communication region. For each communication region, the network device 104 may consult the corresponding register, determine whether the difference parameter exceeds the difference threshold for at least a predetermined number of packets, and determine whether to modify the beamforming parameters for the communication region.

In some embodiments, to reduce the computational load on the processor, the network device 104 may calculate the difference parameter for data packets at a low frequency. If the difference parameter associated with a data packet exceeds the difference threshold, the network device 104 can increase the frequency with which it calculates the difference parameter for subsequent data packets. Thus, the network device 104 may calculate the difference parameter every first number of data packets (X) instead of every data packet. However, if the difference parameter exceeds the difference threshold, the network device 104 may calculate the difference parameter every second number of data packets (Y), where the second number of data packets (Y) is lower than the first number of data packets (X). The network device may calculate the difference parameter for a plurality of data packets (N), such that the second number of packets separates each pair of consecutive data packets in the plurality of data packets. In other words, the network device may calculate the difference parameter every second number of data packets so that the difference parameter is calculated for the plurality of data packets (N). The network device can determine whether to modify the initial beamforming parameters depending on how many of the plurality of data packets are associated with a difference parameter that exceeds the difference threshold. If at least a threshold number of data packets (e.g., at least M data packets out of N data packets) are associated with a difference parameter that exceeds the difference threshold, the network device may determine to modify the initial beamforming parameters. For example, the network device 104 may determine to estimate the difference parameter every X=10 packets. In this example, the network device 104 may estimate the parameter $\rho_{FC}$, estimate the difference parameter (see Eqs. 8-12), and compare the difference parameter with the difference threshold for data packets 1, 11, 21, and so on. The network device 104 may not estimate the parameter $\rho_{FC}$, estimate the difference parameter, and compare the difference parameter with the difference threshold for data packets 2-10, 12-20, and so on. If the difference parameter that is calculated for data packet 21 exceeds the difference threshold, the difference parameter may be determined for every subsequent data packet (e.g., for data packets 22, 23, 24, and so on when Y=1). After estimating the difference parameter for the next N data packets (e.g., for data packets 22-26, if N=5), the network device 104 may determine how many of the N data packets are associated with a difference parameter that exceeds the difference threshold. If at least M data packets out of N data packets are associated with a difference parameter that exceeds the difference threshold, the network device may determine modified beamforming parameters. In other embodiments, the first number of data packets (X), the second number of data packets (Y), the plurality of data packets (N), and the threshold number of data packets (M) may have other suitable values.

The network device 104 may employ various techniques to prevent the difference parameter from incorrectly exceeding the difference threshold because of the effects of noise on the PLC channel. In some embodiments, the network device 104 can calculate the difference parameter for each of a predetermined number of packets. The network device 104 can determine an average difference parameter over the predetermined number of packets and compare the average difference parameter with the difference threshold. For example, the network device 104 can determine average coarse beamforming parameters (or an average coarse parameter $\rho_{FC}$) using the predetermined number of data packets. The network device 104 may use frame control fields from the predetermined number of data packets to determine the average coarse parameter $\rho_{FC}$. The network device 104 may estimate the difference parameter using the initial parameter $\rho_{sound}$ and the average coarse parameter $\rho_{FC}$. The network device 104 may compare the difference parameter with the difference threshold to determine whether to modify the initial beamforming parameters. In another embodiment, the network device 104 may determine the coarse parameter $\rho_{FC}$ (or the difference parameter) for each of the predetermined number of data packets. The network device 104 may estimate the average difference parameter by calculating the average or weighted average of the difference parameter determined for each of the predetermined number of data packets. The network device 104 can compare the average difference parameter with the difference threshold to determine whether to modify the initial beamforming parameters. The network device 104 may use other suitable mathematical operations to combine individual difference parameters determined for each of the data packets to yield a combined difference parameter. The network device 104 can compare the combined difference parameter with the difference threshold to determine whether to modify the initial beamforming parameters. In another embodiment, the network device 104 may calculate the difference parameter for each of the predetermined number of data packets. The network device 104 may determine to modify the initial beamforming parameters if at least a threshold number of consecutive data packets are associated with a difference parameter that exceeds the difference threshold.

In some embodiments, the beamforming parameter estimation unit 114 may determine that the difference parameter associated with multiple communication regions exceeds the difference threshold. In this embodiment, the beamforming parameter estimation unit 114 may employ suitable techniques to determine whether to modify the beamforming parameters for the identified communication regions in a consecutive manner or in parallel. In one embodiment, the beamforming parameter estimation unit 114 may determine to modify the beamforming parameters for a first and second communication regions consecutively; that is, first determine the modified beamforming parameters for the first communication region, and then determine the modified beamforming parameters for the second communication region (i.e., one after the other). In another embodiment, the beamforming parameter estimation unit 114 may determine to modify the beamforming parameters for the first and second communication regions in parallel (i.e., concurrently). Accordingly, the first network device may invalidate the existing beamforming parameters associated with the first and second communication regions at the same time. The first network device can notify the second network device to transmit the sounding messages in both the first and the second communication regions. While the first network device is determining modified beamforming parameters for one or more communication regions, the second network device may continue to transmit data packets in the remaining communication regions using the existing beamforming parameters. Whether to estimate the modified beamforming parameters consecutively or in parallel may depend on the configuration of the first network device, the configuration of the second network device, quality-of-service (QoS) specifications, and/or the type of application. For example, if the first network device is transmitting video stream packets to the second network device, the modified beamforming parameters for the identified communication regions may be estimated consecutively to minimize disruption to the transmission of the video stream packets. As another example, the modified beamforming parameters for the identified communication regions may be estimated in parallel if the first and the second network devices do not have stringent QoS specifications.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module," "unit," or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
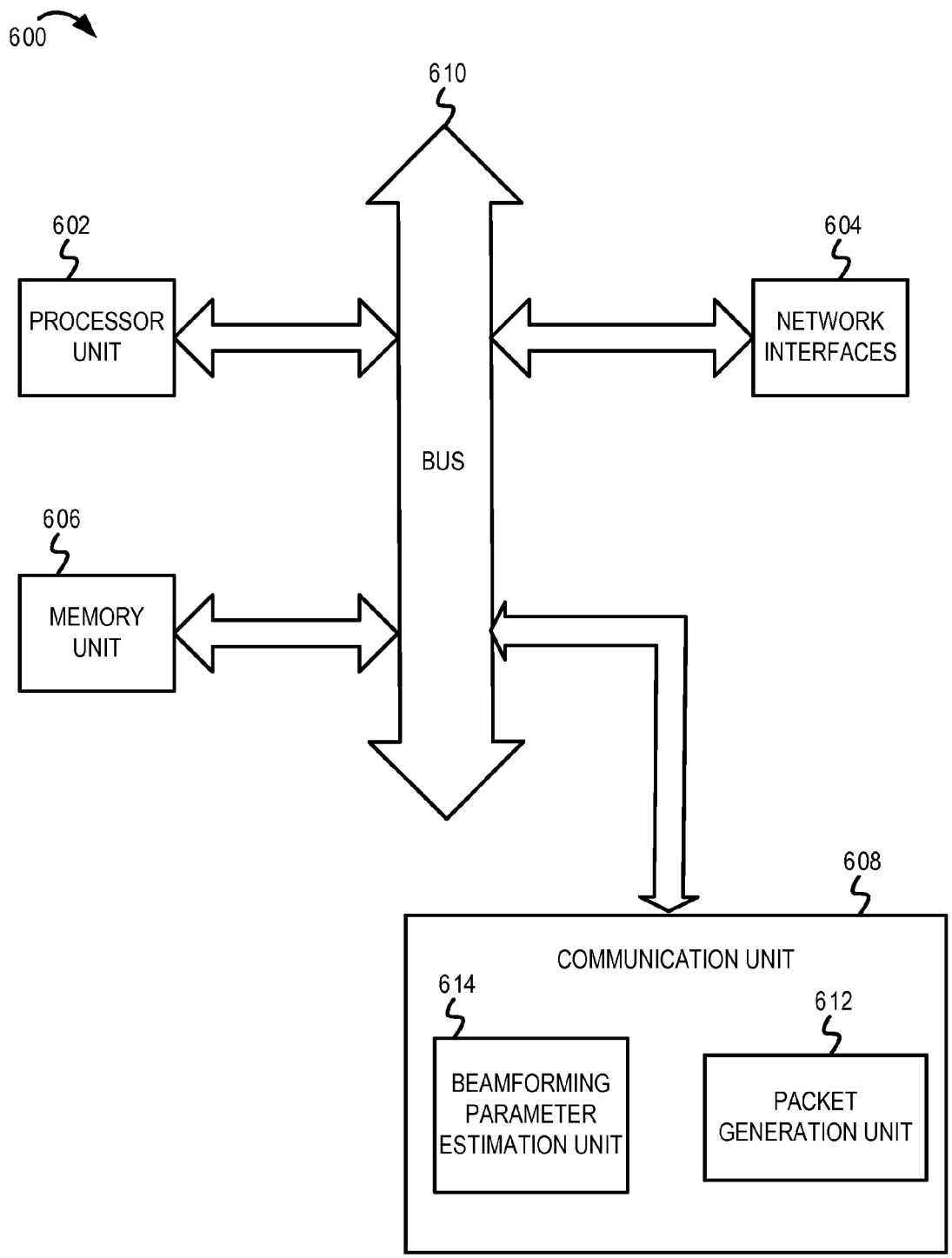
FIG. 6 is a block diagram of one embodiment of an electronic device including a mechanism for adapting beamforming parameters in a communication network.

FIG. 6 is a block diagram of one embodiment of an electronic device 600 including a mechanism for adapting beamforming parameters in a communication network. In some implementations, the electronic device 600 may be one of a desktop computer, a laptop computer, a tablet computer, a smart appliance, a gaming console, a television, a television set-top box (or set-top unit), a media player, a PLC-capable device, or another electronic device including communication capabilities. The electronic device 600 includes a processor unit 602 (possibly including multiple processors, multiple cores, multiple nodes, and/or implementing multithreading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable storage media. The electronic device 600 also includes a bus 610 (e.g., PCI, ISA, PCI-Express, HyperTransport®, InfiniBand®, NuBus, AHB, AXI, etc.). The electronic device 600 also includes a network interface 604, also referred to as a port. The network interface 604 can include a wireless network interface (e.g., a WLAN interface, a Bluetooth® interface, a WiMAX interface, a ZigBee® interface, a Wireless USB interface, etc.) and/or a wired network interface (e.g., a PLC interface, an Ethernet interface, etc.). Furthermore, in some embodiments, the electronic device 600 can execute an IEEE Std. 1905.1 protocol for implementing hybrid communication functionality.

The electronic device 600 also includes a communication unit 608. The communication unit 608 includes a packet generation unit 612 and a beamforming parameter estimation unit 614. The packet generation unit 612 can generate sounding messages and data packets using the appropriate beamforming parameters for transmission to a receiving network device, as described above with reference to FIGS. 1A-5. The beamforming parameter estimation unit 614 can estimate initial beamforming parameters for multiple communication regions of the powerline cycle based, at least in part, on the received sounding messages. The beamforming parameter estimation unit 614 may use data packets (generated using the initial beamforming parameters) to determine coarse beamforming parameters associated with each communication region. The beamforming parameter estimation unit 614 may further determine a difference parameter for each communication region using the corresponding initial beamforming parameters and the coarse beamforming parameters. If the difference parameter is not in accordance with a difference threshold, the beamforming parameter estimation unit 614 may modify the initial beamforming parameters of the communication region, as described above with reference to FIGS. 1A-5.

Any one of these functionalities may be partially (or entirely) implemented in hardware and/or on the processor unit 602. For example, the functionality may be implemented with an application specific integrated circuit (ASIC), in logic implemented in the processor unit 602, in a co-processor on a peripheral device or card, etc. In some embodiments, the communication unit 608 can each be implemented on a system-on-a-chip (SoC), an ASIC, or another suitable integrated circuit to enable communications of the electronic device 600. In some embodiments, the communication unit 608 may include additional processors and memory, and may be implemented in one or more integrated circuits on one or more circuit boards of the electronic device 600. Further, realizations may include fewer or additional components not illustrated in FIG. 6 (e.g., video cards, audio cards, additional network interfaces, peripheral devices, etc.). For example, in addition to the processor unit 602 coupled with the bus 610, the communication unit 608 may include at least one additional processor unit. As another example, although illustrated as being coupled to the bus 610, the memory unit 606 may be coupled to the processor unit 602. As another example, the electronic device 600 may include one or more radio transceivers, processors, memory, and/or other logic to implement the communication protocols and related functionality.

While the embodiments are described with reference to various implementations and exploitations, it will be understood that these embodiments are illustrative and that the scope of the inventive subject matter is not limited to them. In general, techniques for adapting beamforming parameters in a communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   estimating, at a first network device, initial beamforming parameters for a plurality of communication regions of a powerline cycle based, at least in part, on sounding messages received from a second network device;
   determining coarse beamforming parameters for the plurality of communication regions based, at least in part, on a data packet received from the second network device using the initial beamforming parameters; and
   determining whether to estimate a first modified beamforming parameter for a first communication region based, at least in part, on a first initial beamforming parameter associated with the first communication region and a first coarse beamforming parameter associated with the first communication region.

2. The method of claim 1, further comprising:
   notifying the second network device to retransmit the sounding messages in the first communication region for estimating the first modified beamforming parameter in response to determining to estimate the first modified beamforming parameter.

3. The method of claim 2, wherein the notification further comprises:
   an indication to the second network device to continue transmitting subsequent data packets in a remainder of the plurality of communication regions.

4. The method of claim 1, further comprising:
comparing the first coarse beamforming parameter with the first initial beamforming parameter,
wherein said determining whether to estimate the first modified beamforming parameter is based, at least in part, on comparing the first coarse beamforming parameter with the first initial beamforming parameter.

5. The method of claim 1, wherein said determining whether to estimate the first modified beamforming parameter comprises:
determining a difference parameter associated with the first communication region based, at least in part, on the first initial beamforming parameter and the first coarse beamforming parameter; and
determining whether to estimate the first modified beamforming parameter based, at least in part, on comparing the difference parameter with a difference threshold.

6. The method of claim 5, further comprising:
determining to estimate the first modified beamforming parameter in response to determining that the difference parameter exceeds the difference threshold.

7. The method of claim 5, further comprising:
determining to continue using the first initial beamforming parameter in response to determining that the difference parameter does not exceed the difference threshold.

8. The method of claim 1, further comprising:
for each of a plurality of data packets received in the first communication region using the first initial beamforming parameter,
determining a coarse beamforming parameter based, at least in part, on the data packet;
determining a difference parameter associated with the data packet based, at least in part, on the first initial beamforming parameter and the coarse beamforming parameter; and
determining whether the difference parameter exceeds a difference threshold.

9. The method of claim 8, wherein said determining whether to estimate the first modified beamforming parameter comprises:
estimating the first modified beamforming parameter in response to determining that at least a predetermined number of consecutive data packets are associated with difference parameters that exceed the difference threshold.

10. The method of claim 1, further comprising:
for each of a plurality of data packets received in the first communication region using the first initial beamforming parameter,
determining a coarse beamforming parameter based, at least in part, on the data packet;
determining a difference parameter associated with the data packet based, at least in part, on the first initial beamforming parameter and the coarse beamforming parameter; and
determining an average difference parameter based, at least in part, on an average of a plurality of difference parameters associated with the plurality of data packets.

11. The method of claim 10, wherein said determining whether to estimate the first modified beamforming parameter comprises:
estimating the first modified beamforming parameter in response to determining that the average difference parameter exceeds a difference threshold.

12. The method of claim 1, further comprising:
determining a first difference parameter associated with a first data packet and a second difference parameter associated with a second data packet, wherein the first data packet and the second data packet are received in the first communication region and separated by a first number of data packets;
in response to determining that at least one of the first difference parameter and the second difference parameter exceeds a difference threshold,
determining a third difference parameter associated with a third data packet and a fourth difference parameter associated with a fourth data packet, wherein the third and fourth data packets are received in the first communication region and separated by a second number of data packets that is less than the first number of data packets; and
estimating the first modified beamforming parameter in response to determining that at least one of the third difference parameter and the fourth difference parameter exceeds the difference threshold.

13. The method of claim 1, further comprising:
determining difference parameters for a plurality of data packets separated by a first number of data packets; and
estimating the first modified beamforming parameter associated with the first communication region in response to determining that at least a threshold number of the plurality of data packets are associated with a difference parameter that exceeds a difference threshold.

14. The method of claim 1, further comprising:
determining a difference parameter associated with the first communication region based, at least in part, on the first initial beamforming parameter and the first coarse beamforming parameter, wherein the difference parameter is determined across a subset of a plurality of sub-carriers associated with the data packet.

15. The method of claim 1, further comprising:
for each of a plurality of sub-carriers associated with the data packet,
determining a coarse beamforming parameter associated with the sub-carrier;
determining a difference between the coarse beamforming parameter associated with the sub-carrier and the first initial beamforming parameter;
determining an absolute value of the difference associated with the sub-carrier; and
determining an average of a plurality of absolute values across the plurality of sub-carriers to yield a difference parameter associated with the data packet,
wherein said determining whether to estimate the first modified beamforming parameter is based, at least in part, on whether the difference parameter exceeds a difference threshold.

16. The method of claim 1, further comprising:
determining an initial channel estimate associated with the first communication region based, at least in part, on a sounding message received in the first communication region;
determining a coarse channel estimate associated with the first communication region based, at least in part, on the data packet received in the first communication region using the first initial beamforming parameter;
for each of a plurality of sub-carriers, determining an absolute value of a difference between the coarse channel estimate that corresponds to the sub-carrier and the initial channel estimate that corresponds to the sub-carrier; and
determining an average of a plurality of absolute values across the plurality of sub-carriers to yield a difference parameter associated with the data packet, wherein said determining whether to estimate the first modified beamforming parameter is based, at least in part, on whether the difference parameter exceeds a difference threshold.

17. The method of claim 1, wherein, in response to determining to estimate the first modified beamforming parameter, the method further comprises:
receiving, at the first network device, the sounding messages in the first communication region from the second network device;
determining the first modified beamforming parameter based, at least in part, on the sounding messages; and
transmitting the first modified beamforming parameter from the first network device to the second network device during the first communication region.

18. The method of claim 1, wherein, after estimating the first modified beamforming parameter for the first communication region, the method further comprises:
receiving subsequent data packets in the first communication region using the first modified beamforming parameter; and
receiving subsequent data packets in a remainder of the plurality of communication regions using the initial beamforming parameters associated with the remainder of the plurality of communication regions.

19. The method of claim 1, wherein, in response to determining to estimate the first modified beamforming parameter, the method further comprises:
transmitting the first coarse beamforming parameter from the first network device to the second network device to cause the second network device to use the first coarse beamforming parameter as the first modified beamforming parameter for the first communication region.

20. A method comprising:
transmitting sounding messages in a plurality of communication regions of a powerline cycle from a first network device to a second network device of a communication network;
receiving initial beamforming parameters from the second network device, wherein the initial beamforming parameters are determined by the second network device based at least in part, on the sounding messages;
transmitting, from the first network device, a first data packet in a first communication region of the powerline cycle using a first initial beamforming parameter associated with the first communication region;
receiving a notification from the second network device indicating to retransmit the sounding messages in the first communication region; and
retransmitting, from the first network device, the sounding messages in the first communication region and transmitting data packets in a remainder of the plurality of communication regions.

21. The method of claim 20, further comprising:
receiving a first modified beamforming parameter for the first communication region from the second network device, wherein the first modified beamforming parameter is determined by the second network device based, at least in part, on the sounding messages retransmitted in the first communication region; and
transmitting, from the first network device, subsequent data packets in the first communication region using the first modified beamforming parameter and transmitting subsequent data packets in the remainder of the plurality of communication regions using the initial beamforming parameters.

22. A first network device comprising:
a processor; and
a beamforming parameter estimation unit coupled with the processor, the beamforming parameter estimation unit configured to:
estimate initial beamforming parameters for a plurality of communication regions of a powerline cycle based, at least in part, on sounding messages received from a second network device;
determine coarse beamforming parameters for the plurality of communication regions based, at least in part, on a data packet received from the second network device using the initial beamforming parameters; and
determine whether to estimate a first modified beamforming parameter for a first communication region based, at least in part, on a first initial beamforming parameter associated with the first communication region and a first coarse beamforming parameter associated with the first communication region.

23. The first network device of claim 22, wherein the beamforming parameter estimation unit is further configured to:
notify the second network device to retransmit the sounding messages in the first communication region for estimating the first modified beamforming parameter in response to determining to estimate the first modified beamforming parameter.

24. The first network device of claim 22, wherein the beamforming parameter estimation unit configured to determine whether to estimate the first modified beamforming parameter comprises the beamforming parameter estimation unit configured to:
determine a difference parameter associated with the first communication region based, at least in part, on the first initial beamforming parameter and the first coarse beamforming parameter; and
determine whether to estimate the first modified beamforming parameter based, at least in part, on comparing the difference parameter with a difference threshold.

25. The first network device of claim 22, wherein the beamforming parameter estimation unit is further configured to:
for each of a plurality of data packets received in the first communication region using the first initial beamforming parameter,
determine a coarse beamforming parameter based, at least in part, on the data packet; and
determine a difference parameter associated with the data packet based, at least in part, on the first initial beamforming parameter and the coarse beamforming parameter,
wherein the beamforming parameter estimation unit is configured to estimate the first modified beamforming parameter in response to determining that at least a predetermined number of consecutive data packets are associated with difference parameters that exceed a difference threshold.

26. The first network device of claim 22, wherein the beamforming parameter estimation unit is further configured to:
determine a first difference parameter associated with a first data packet and a second difference parameter associated with a second data packet, wherein the first data packet and the second data packet are received in the first communication region and separated by a first number of data packets;
in response to determining that at least one of the first difference parameter and the second difference parameter exceeds a difference threshold, determine a third difference parameter associated with a third data packet and a fourth difference parameter associated with a fourth data packet, wherein the third and fourth data packets are received in the first communication region and separated by a second number of data packets that is less than the first number of data packets; and estimate the first modified beamforming parameter in response to determining that at least one of the third difference parameter and the fourth difference parameter exceeds the difference threshold.

27. The first network device of claim 22, wherein, after estimating the first modified beamforming parameter for the first communication region, the beamforming parameter estimation unit is further configured to:

receive subsequent data packets in the first communication region using the first modified beamforming parameter; and receive subsequent data packets in a remainder of the plurality of communication regions using the initial beamforming parameters associated with the remainder of the plurality of communication regions.

28. A non-transitory machine-readable storage medium having machine executable instructions stored therein, the machine executable instructions comprising instructions to:

estimate, at a first network device, initial beamforming parameters for a plurality of communication regions of a powerline cycle based, at least in part, on sounding messages received from a second network device;

determine coarse beamforming parameters for the plurality of communication regions based, at least in part, on a data packet received from the second network device using the initial beamforming parameters; and determine whether to estimate a first modified beamforming parameter for a first communication region based, at least in part, on a first initial beamforming parameter associated with the first communication region and a first coarse beamforming parameter associated with the first communication region.

29. The non-transitory machine-readable storage medium of claim 28, wherein said instructions to determine whether to estimate the first modified beamforming parameter comprise instructions to:

determine a difference parameter associated with the first communication region based, at least in part, on the first initial beamforming parameter and the first coarse beamforming parameter; and determine whether to estimate the first modified beamforming parameter based, at least in part, on comparing the difference parameter with a difference threshold.

30. The non-transitory machine-readable storage medium of claim 28, wherein said instructions further comprise instructions to:

for each of a plurality of data packets received in the first communication region using the first initial beamforming parameter, determine a coarse beamforming parameter based, at least in part, on the data packet; and determine a difference parameter associated with the data packet based, at least in part, on the first initial beamforming parameter and the coarse beamforming parameter, wherein said instructions to estimate the first modified beamforming parameter is in response to determining that at least a predetermined number of consecutive data packets are associated with difference parameters that exceed a difference threshold.

* * * * *